(12) United States Patent  (10) Patent No.: US 9,100,624 B2
Matsuzaki  (45) Date of Patent: Aug. 4, 2015

(54) INFORMATION PROCESSING APPARATUS, METHOD AND MEDIUM FOR GENERATING COLOR CORRECTION DATA WITH REFERENCE TO MEASURED COLOR VALUES FROM A NUMBER OF SENSORS

(75) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 13/534,510

(22) Filed: Jun. 27, 2012

(65) Prior Publication Data

US 2013/0003091 A1    Jan. 3, 2013

(30) Foreign Application Priority Data

Jun. 30, 2011    (JP) .................................. 2011-146502

(51) Int. Cl.
 *G06K 1/00*    (2006.01)
 *H04N 1/60*    (2006.01)
(52) U.S. Cl.
 CPC .................................. *H04N 1/6033* (2013.01)
(58) Field of Classification Search
 None
 See application file for complete search history.

(56) References Cited

U.S. PATENT DOCUMENTS

| 7,822,375 | B2 * | 10/2010 | Osawa | 399/301 |
|---|---|---|---|---|
| 7,854,488 | B2 * | 12/2010 | Yamazaki | 347/19 |
| 8,154,767 | B2 * | 4/2012 | Muramatsu | 358/3.06 |
| 8,243,326 | B2 * | 8/2012 | Olson | 358/1.9 |
| 8,326,028 | B2 * | 12/2012 | Nakashima et al. | 382/163 |
| 2004/0126009 | A1 * | 7/2004 | Takenaka et al. | 382/162 |
| 2005/0281459 | A1 * | 12/2005 | Bala et al. | 382/162 |
| 2007/0229862 | A1 * | 10/2007 | Derhak et al. | 358/1.9 |
| 2010/0103188 | A1 * | 4/2010 | Sasaki | 345/590 |

FOREIGN PATENT DOCUMENTS

JP    2006-165864 A    6/2006

* cited by examiner

*Primary Examiner* — Tammy Pham
*Assistant Examiner* — Steven Kau
(74) *Attorney, Agent, or Firm* — Canon USA Inc. IP Division

(57) ABSTRACT

An image processing apparatus includes a plurality of sensors arrange for reading different patches in a chart for color correction that includes a plurality of patches, a unit configured to acquire information on a color gamut, a color gamut division unit configured to divide the acquired color gamut into divided color gamuts, a determination unit configured to determine a plurality of patches to be used in a measurement of each divided color gamut, and a chart data generation unit configured to generate chart data of the chart in such a way as to allow one and the same sensor of the plurality of sensors to measure the plurality of patches of a respective divided color gamut determined by the determination unit.

23 Claims, 16 Drawing Sheets

FIG.9
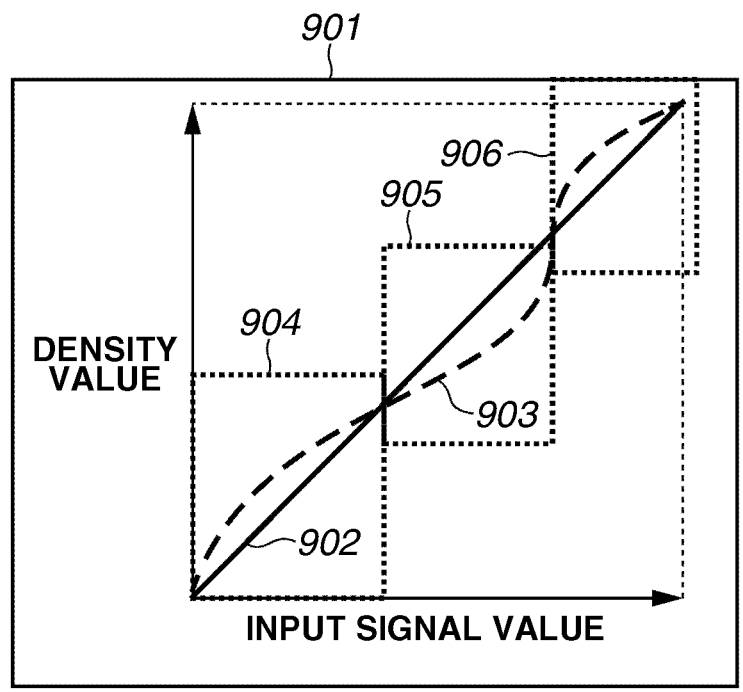
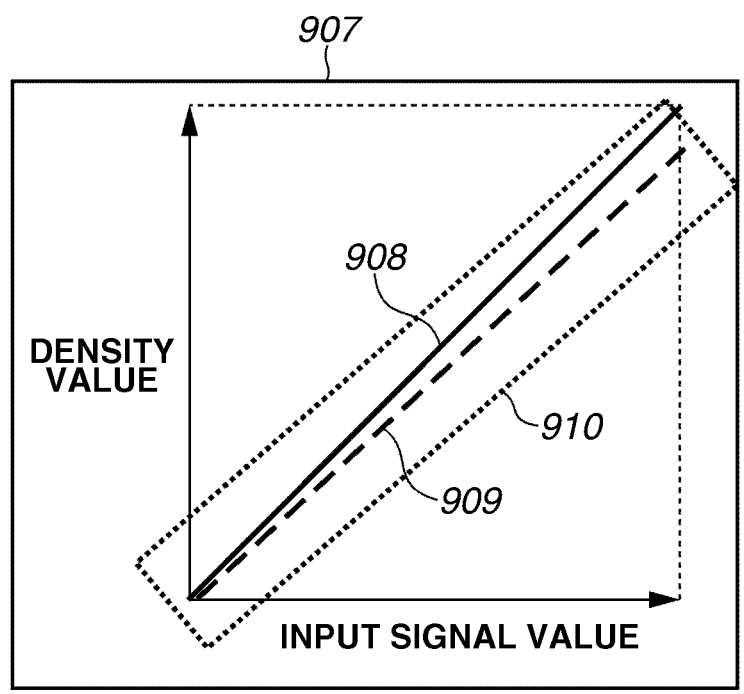

INFORMATION PROCESSING APPARATUS, METHOD AND MEDIUM FOR GENERATING COLOR CORRECTION DATA WITH REFERENCE TO MEASURED COLOR VALUES FROM A NUMBER OF SENSORS

BACKGROUND OF THE INVENTION

1. Field of the Invention

The present invention relates to an image processing apparatus that can generate chart data to be used to correct colors of an output product printed by a printer. Further, the present invention relates to an image processing method, and a program capable of generating image processing parameters.

2. Description of the Related Art

Many electrophotographic apparatuses having been recently introduced have improved performances. For example, there is a conventional electrophotographic machine comparable to a printing machine in the capability of realizing higher image quality. However, the electrophotographic apparatuses are generally inferior to the printing machine in color variation amount that is caused due to unstableness peculiar to electrophotographic apparatuses.

Hence, the technique employed for a conventional electrophotographic apparatus to solve the above-described problem is the calibration using a one-dimensional gradation correction look-up table (LUT) that is dedicated to each of cyan, magenta, yellow, and black (key tone) (hereinafter, referred to as C, M, Y, and K) toners.

The LUT is a table that includes a predetermined number of output data corresponding to input data that are spaced discretely at specific intervals. For example, the LUT is usable to express non-linear characteristics that cannot be expressed using arithmetic expressions. The one-dimensional gradation correction LUT indicates output signal values of a printer that can express input signal values of C, M, Y, and K colors. The printer forms an image on paper using toners corresponding to the output signal values.

First, a chart including a plurality of pieces of patch data that are different in gradation is prepared beforehand for each of C, M, Y, and K toners and output by a printer. The value of each patch printed on the chart is read by a scanner or a colorimeter. Then, the read value (i.e., measurement data) is compared with target data stored beforehand. Thus, the one-dimensional gradation correction LUT can be generated independently for each of the C, M, Y, and K colors.

However, the one-dimensional gradation correction LUT applicable to the above-described gradation characteristics of a single color cannot assure the color reproducibility for a "mixed (or compound) color", such as red, green, blue, and CMY-based gray, which can be formed by mixing a plurality of types of toners, because of non-linear differences that may be generated depending on individual printers.

Hence, as discussed in Japanese Patent Application Laid-Open No. 2006-165864, it is conventionally proposed to prepare a chart using mixed (or compound) colors in a region that can be reproduced by a printer, measure the chart data with a scanner or a colorimeter, compare the measured values with target values (target data), and generate correction values.

The International Color Consortium (ICC) provides ICC profiles as data usable in color conversion. It is conventionally known that color differences of mixed (or compound) colors can be corrected by amending a destination profile included in the ICC profiles.

Such a conventional method includes preparing a chart of mixed (or compound) colors generated by a printer, and measuring the chart data with a scanner or a colorimeter. The conventional method further includes generating difference data with reference to color measurement results and target values, updating, based on the generated difference data, a three-dimensional LUT (destination profile), which is used to convert a device-independent color space (L*a*b*) included in the ICC profiles into a device-dependent color space (CMYK), and correcting the mixed (or compound) colors based on the updated three-dimensional LUT. The color space L*a*b* is one of the device-independent color spaces. The value L* represents "luminance", the value a* represents "hue", and the value b* represents "saturation."

Further, it is conventionally known to provide a built-in sensor on a sheet conveyance path extending from a sheet fixing position to a sheet discharge position in the printer, instead of using a scanner or an externally connected colorimeter. A system equipped with the built-in sensor can read a gradation correction chart while the chart is conveyed along the sheet conveyance path after passing through a fixing device and before exiting from the printer.

After a calibration CMYK chart is printed and fixed, the chart data is read by the sensor. The read values are compared with target data prepared beforehand, and a one-dimensional correction LUT can be generated. According to the system equipped with a color-value measuring sensor, the sensor is fixed at a predetermined position relative to a sheet (i.e., a target to be read) being conveyed along the sheet conveyance path. Therefore, the number of patches (i.e., chart data) on the chart can be increased only in the sub scanning direction (i.e., sheet conveyance direction).

To ensure the sensor is able to read patch data on a chart, each patch to be printed on the chart is required to have a certain level of size. Therefore, the total number of pieces of chart data that can be disposed on a sheet is limited. Therefore, compared to the method using a scanner, the method employing a built-in sensor requires generating a number of charts to enable the sensor to read a sufficient number of patches. The amount of paper consumption thus increases greatly. Therefore, a conventional system is configured to increase the number of sensors mounted on a single machine to increase the number of pieces of chart data that can be read on a sheet of paper.

However, when a plurality of sensors is used for a single calibration, the accuracy of reading values decreases significantly because of individual differences of respective sensors. Therefore, the final calibration accuracy decreases correspondingly. According to the correction using the one-dimensional LUT, an independent sensor is allocated to each of C, M, Y, and K toners. When the same toner patch is read by the same sensor, influences of the differences caused by individual sensors can be suppressed adequately. However, the "mixed (or compound) color patch" that can be formed by mixing a plurality of types of toners tends to be influenced greatly by the differences of individual sensors, because matching the toner with the sensor is not easy. As described above, in the calibration of "mixed (or compound) colors" having various hue/lightness/saturation characteristics, adverse influences may arise because of the differences of individual sensors.

SUMMARY OF THE INVENTION

According to an aspect of the present invention, an image processing apparatus includes a plurality of sensors arrange for reading different patches in a chart for color correction that includes a plurality of patches, a unit configured to acquire information on a color gamut, a color gamut division unit configured to divide the acquired color gamut into divided color gamuts, a determination unit configured to determine a plurality of patches to be used in a measurement of each divided color gamut, and a chart data generation unit configured to generate chart data of the chart in such a way as to allow one and the same sensor of the plurality of sensors to measure the plurality of patches of a respective divided color gamut determined by the determination unit.

According to an exemplary embodiment of the present invention, when a system is configured to correct mixed (or compound) colors based on measurement values obtained by a plurality of sensors, it becomes feasible to correct the mixed (or compound) colors while reducing adverse influences on the image quality relating to gradation characteristics even when the sensors have individual differences.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates differences in gradation characteristics that may be caused when sensors have individual differences.

DESCRIPTION OF THE EMBODIMENTS

Various exemplary embodiments, features, and aspects of the invention will be described in detail below with reference to the drawings.

In an exemplary embodiment of the present invention, an example method for generating a chart to be used to correct the output density of a mixed (or compound) color, which can be realized by a device with a built-in sensor provided in a printer, is described below. As described in the background art, the built-in sensor is disposed fixedly near a sheet conveyance path that extends from a sheet fixing portion to a sheet discharge portion. Further, the sensor can measure a density value and a luminance value of each patch data generated on the chart. Further, the sensor can detect color space values (e.g., L*a*b* and XYZ) that are not dependent on the device. Further, the sensor can detect the reflectance.

Figure 1:
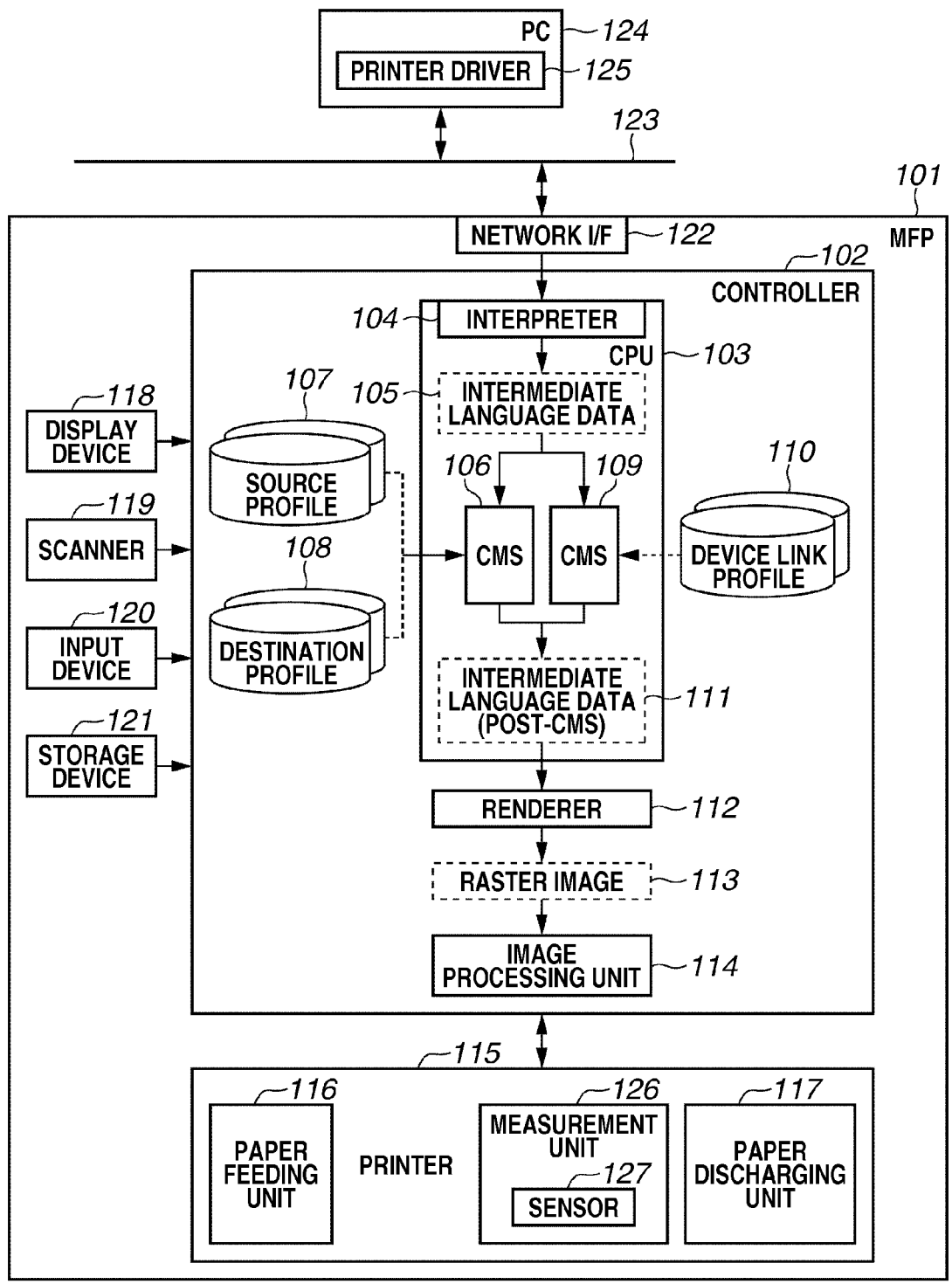
FIG. 1 illustrates an example configuration of a system according to an exemplary embodiment of the present invention.

FIG. 1 illustrates an example system configuration according to the present exemplary embodiment. A first multifunction peripheral (MFP) 101 uses a plurality types of (C, M, Y, and K) toners. Further, a personal computer (PC) 124 is connected to the first MFP 101 via a network 123. The PC 124 includes a printer driver 125 that can transmit print data to the first MFP 101.

The MFP 101 has the following configuration. A network interface (I/F) 122 can receive print data and can transmit a raster image and control data as described below. A controller 102 includes a central processing unit (CPU) 103, a renderer 112, and an image processing unit 114. The CPU 103 includes an interpreter 104 that can interpret a page description language (PDL) portion of the received print data and generates intermediate language data 105.

A first CMS 106 has the capability of performing color conversion on the intermediate language data 105 with reference to a source profile 107 and a destination profile 108. The first CMS 106 generates intermediate language data (post-CMS) 111. In the present exemplary embodiment, the technical terminology "CMS" stands for a "color management system" that can perform color conversion using profile information as described below.

Further, the source profile 107 is a profile that can be used to convert a device-dependent color space (e.g., RGB or CMYK) into a device-independent color space (e.g., L*a*b* or XYZ) defined by Commission Internationale de l'Eclairage (CIE). The device-independent color space XYZ uses three types of stimulus values in color expression, and is, therefore, not different from the other device-independent color space L*a*b*.

Further, the destination profile 108 is a profile that can be used to convert a device-independent color space into a CMYK color space that is dependent on the device (i.e., a printer 115).

On the other hand, a second CMS 109 has the capability of performing color conversion on the intermediate language data 105 with reference to a device link profile 110. As a result, the second CMS 109 can generate intermediate language data (post-CMS) 111. In the present exemplary embodiment, the device link profile 110 is a profile that can be used to convert a device-dependent color space (e.g., RGB or CMYK) directly into the CMYK color space that is dependent on the device (i.e., the printer 115). The selection between the first CMS 106 and the second CMS 109 is dependent on the setting of the printer driver 125.

In the present exemplary embodiment, the first CMS 106 and the second CMS 109 are different in the type of a profile to be used. However, the first CMS 106 and the second CMS 109 can be replaced by a single CMS that can use all of the above-described profiles. Further, the profile type is not limited to the one described in the present exemplary embodiment. Any other profile is usable if it can use the device-dependent CMYK color space of the printer 115.

The renderer 112 can generate a raster image 113 based on the generated intermediate language data (post-CMS) 111. The image processing unit 114 can perform image processing on the raster image 113 or an image having been read by a scanner 119. The printer 115 connected to the controller 102 is a printer that can form output data on paper using colored (e.g., C, M, Y, and K) toners. The printer 115 includes a paper feeding unit 116 that can feed paper and a paper discharging unit 117 that can discharge the paper on which output data is formed.

A display device 118 can display a user interface (UI) that indicates an instruction to a user or the state of the MFP 101. The scanner 119 is a scanner that includes an automatic document feeder. The scanner 119 can irradiate a plurality of stacked document images or a single document image with light emitted from a light source (not illustrated). A lens forms a reflected document image on a solid-state image sensor, such as a charge coupled device (CCD) sensor.

The solid-state image sensor can output a raster image reading signal as image data. An input device 120 is an interface that can receive an input from a user. A storage device 121 can store data processed by the controller 102 or data received by the controller 102.

The printer 115 includes a measurement unit 126. The measurement unit 126 includes a sensor 127 that can acquire color space values, such as L*a*b* and XYZ, which are not dependent on a device. The measurement unit 126 causes the sensor 127 to read a patch on the paper output by the printer 115. The measurement unit 126 transmits numerical value information obtained by the sensor 127 to the controller 102. The controller 102 performs calculations using the numerical value information for the color correction of a single color or a mixed (or compound) color.

Figure 3:
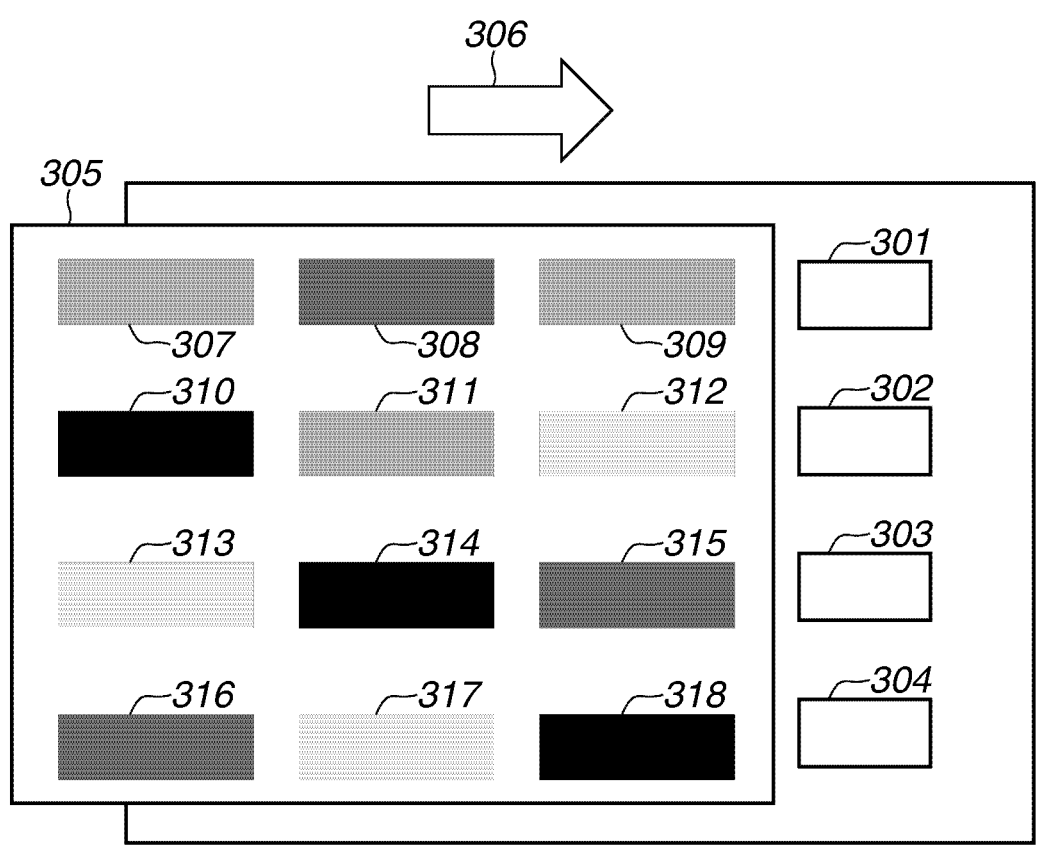
FIG. 3 illustrates a detailed configuration of a measurement unit provided in a printer.

FIG. 3 illustrates a detailed configuration of the sensor 127. It is necessary to fix the position of the sensor 127 provided in the measurement unit 126. Therefore, if the number of reading patches to be generated on a chart is increased, it is necessary to dispose a larger number of reading patches along a paper conveyance direction 306. Further, the number of patches on the paper that can be read by a single sensor is limited. Therefore, it is necessary to increase the number of sensors to be positioned along a line perpendicular to the paper conveyance direction 306.

The sensor 127 includes four sensors 301 to 304 as illustrated in FIG. 3. A chart 305 includes a plurality of patches 307 to 318 that are arranged regularly along a plurality of rows that correspond to the setup positions of the sensors 301 to 304, respectively. When the paper is conveyed along the paper conveyance direction 306, respective patches on the chart 305 pass through the corresponding sensors. The measurement unit 126 acquires a measured color value from each sensor and transmits the acquired measured color value to the controller 102.

Figure 2:
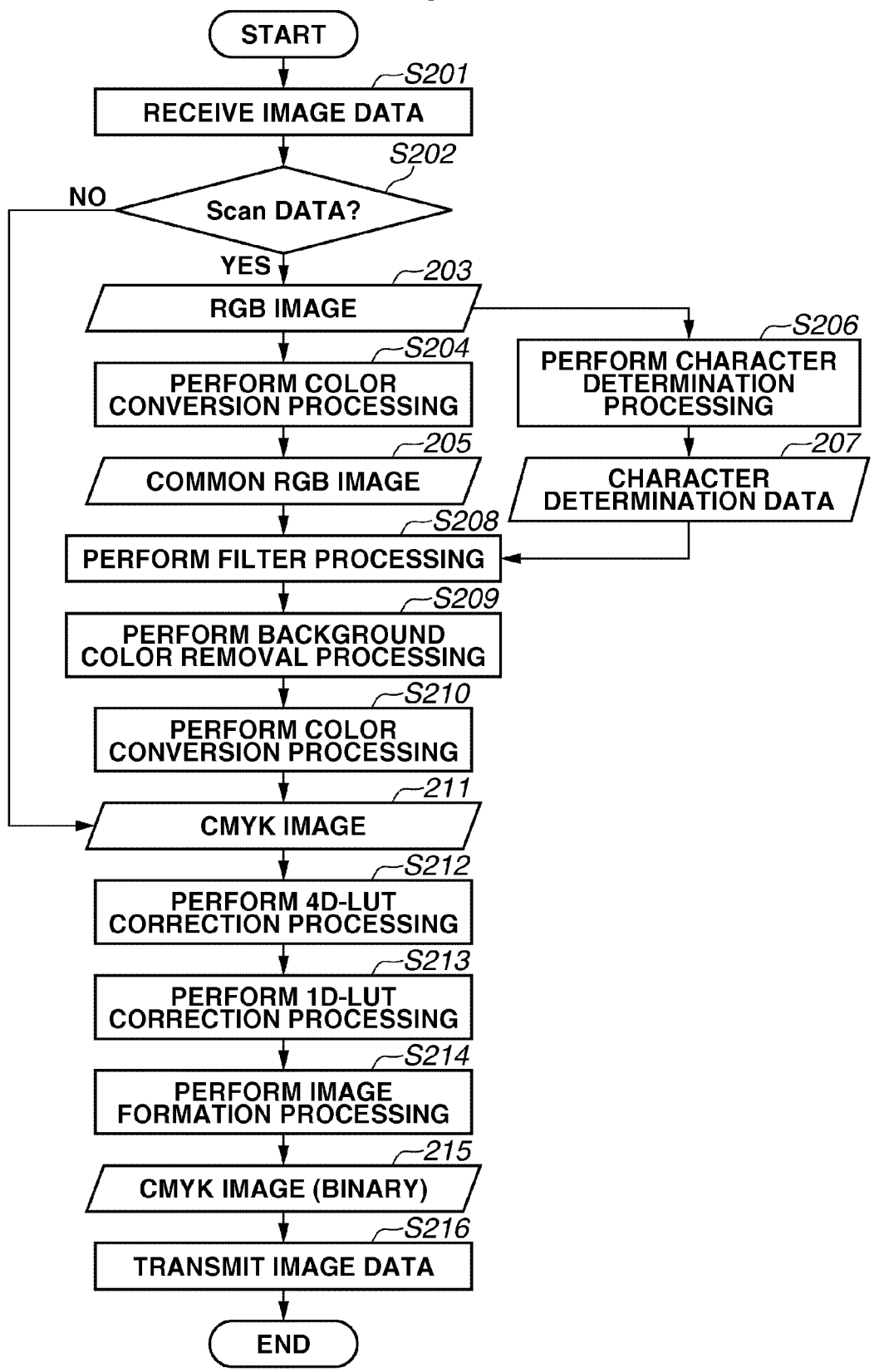
FIG. 2 is a flowchart illustrating an example procedure of image processing according to an exemplary embodiment of the present invention.

Next, an example procedure of processing that can be performed by the image processing unit 114 is described below with reference to FIG. 2.

In step S201, the image processing unit 114 receives image data. Then, in step S202, the image processing unit 114 determines whether the received data is scanning data received from the scanner 119 or the raster image 113 transmitted from the printer driver 125. If the received data is not the scanning data, i.e., when the received data is the raster image 113, the CMS converts the raster image 113 into a CMYK image 211 (i.e., device-dependent CMYK signals).

If the received data is the scanning data, i.e., when the received data is the RGB image 203, then in step S204, the image processing unit 114 performs color conversion processing and generates a common RGB image 205. In the present exemplary embodiment, the common RGB image 205 is an image defined in an RGB color space that is not dependent on the device. Therefore, the common RGB image 205 can be converted into a device-independent color space (e.g., L*a*b*) through appropriate calculations.

Concurrently, in step S206, the image processing unit 114 performs character determination processing and generates character determination data 207. In the present exemplary embodiment, the image processing unit 114 detects edges of an image and generates the character determination data 207.

Then, in step S208, the image processing unit 114 performs filter processing on the common RGB image 205. In the present exemplary embodiment, the image processing unit 114 differentiates the filter processing for each of a character portion and a non-character portion, using the character determination data 207.

Next, in step S209, the image processing unit 114 performs background color removal processing. In step S210, the image processing unit 114 performs color conversion processing to generate the CMYK image 211 that does not include any background colors.

Next, in step S212, the image processing unit 114 performs 4D-LUT correction processing. The 4D-LUT is a four-dimensional LUT that is usable to convert C, M, Y, and K into different C, M, Y, and K. When the 4D-LUT is used, it becomes feasible to correct a mixed (or compound) color, i.e., a color that can be formed using a plurality of types of toners. An example method for generating a mixed (or compound) color correction 4D-LUT is described in detail below.

If the mixed (or compound) color correction has been completed, then in step S213, the image processing unit 114 performs 1D-LUT correction processing to correct gradation characteristics of each single color of C, M, Y, and K using a 1D-LUT. In the present exemplary embodiment, the 1D-LUT is a one-dimensional LUT that is usable to correct each of C, M, Y, and K colors.

An example 1D-LUT generation method includes comparing a measured color value of each color with a target value thereof and generating a correction value in such a way as to reproduce the target value, although not described in detail.

In step S214, the image processing unit 114 performs image formation processing (such as halftone processing and error diffusion processing) to generate CMYK image (binary) 215. Then, in step S216, the image processing unit 114 transmits image data to the printer 115.

Figure 5:
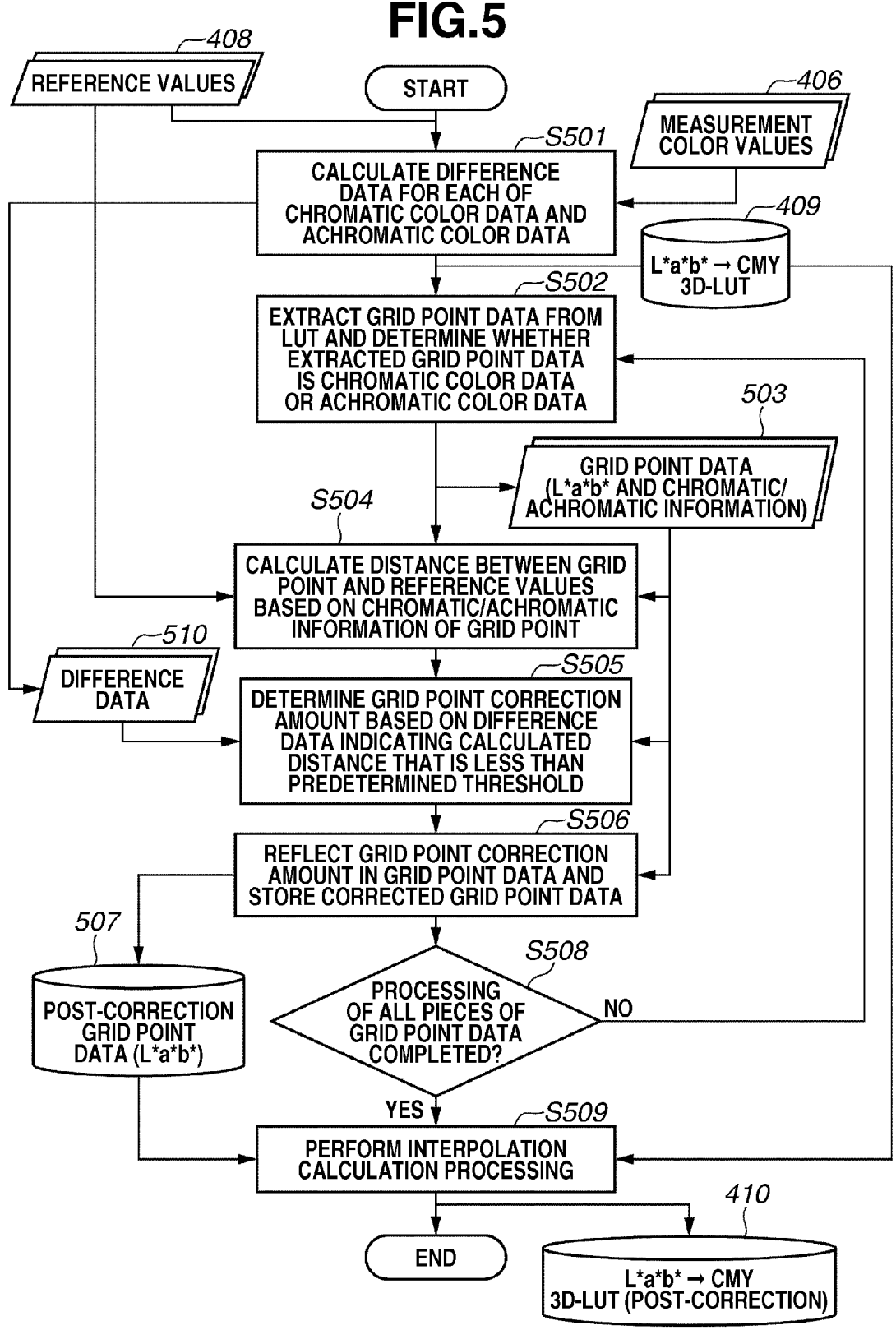
FIG. 5 is a flowchart illustrating three-dimensional LUT correction processing to be performed in the mixed (or compound) color calibration processing according to an exemplary embodiment of the present invention.
Figure 6:
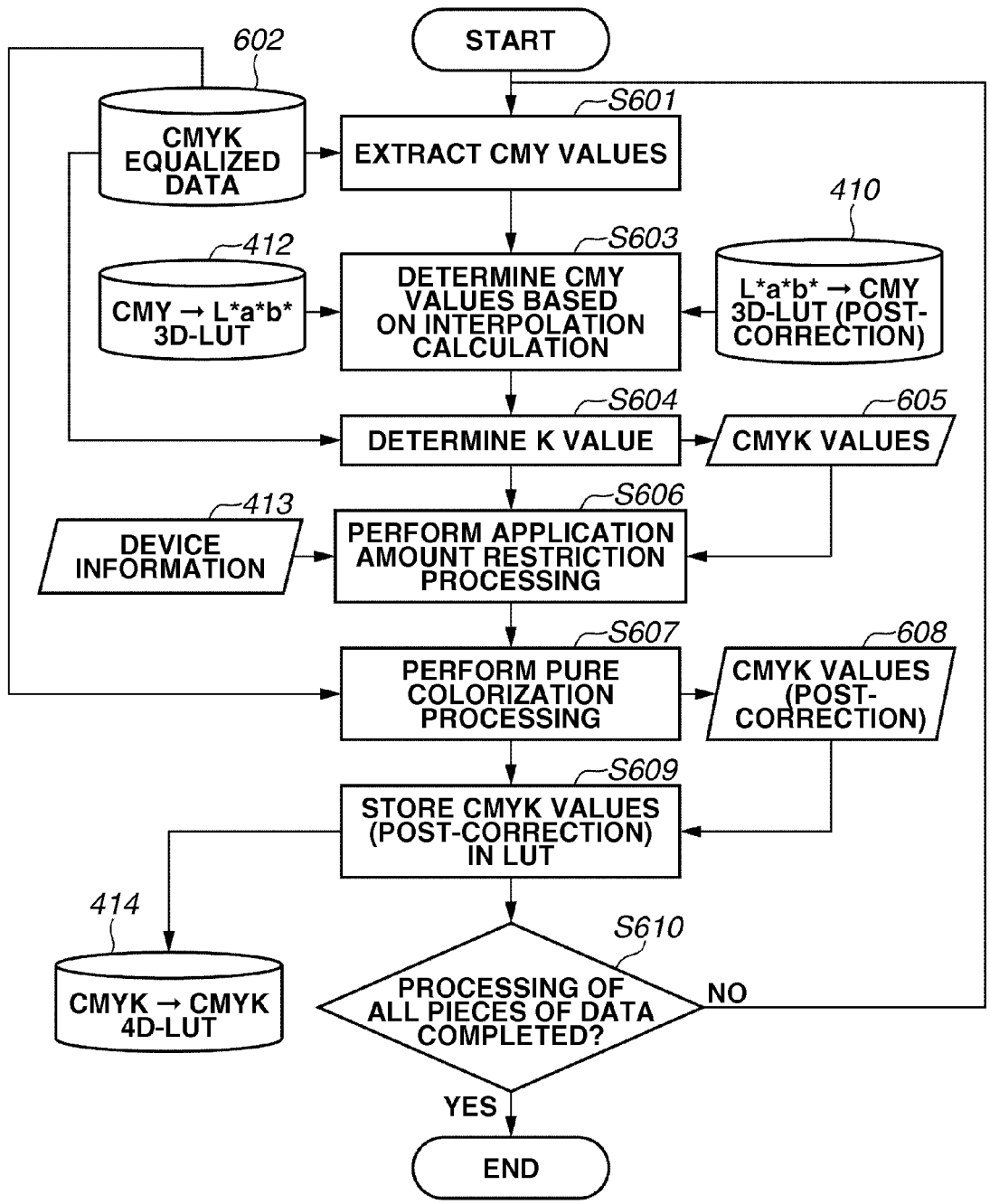
FIG. 6 is a flowchart illustrating four-dimensional LUT generation processing to be performed in the mixed (or compound) color calibration processing according to an exemplary embodiment of the present invention.

Next, an example procedure for generating the mixed (or compound) color correction 4D-LUT is described below with reference to FIG. 4 to FIG. 6. The following processing begins with an instruction from the CPU 103 of the controller 102.

Figure 4:
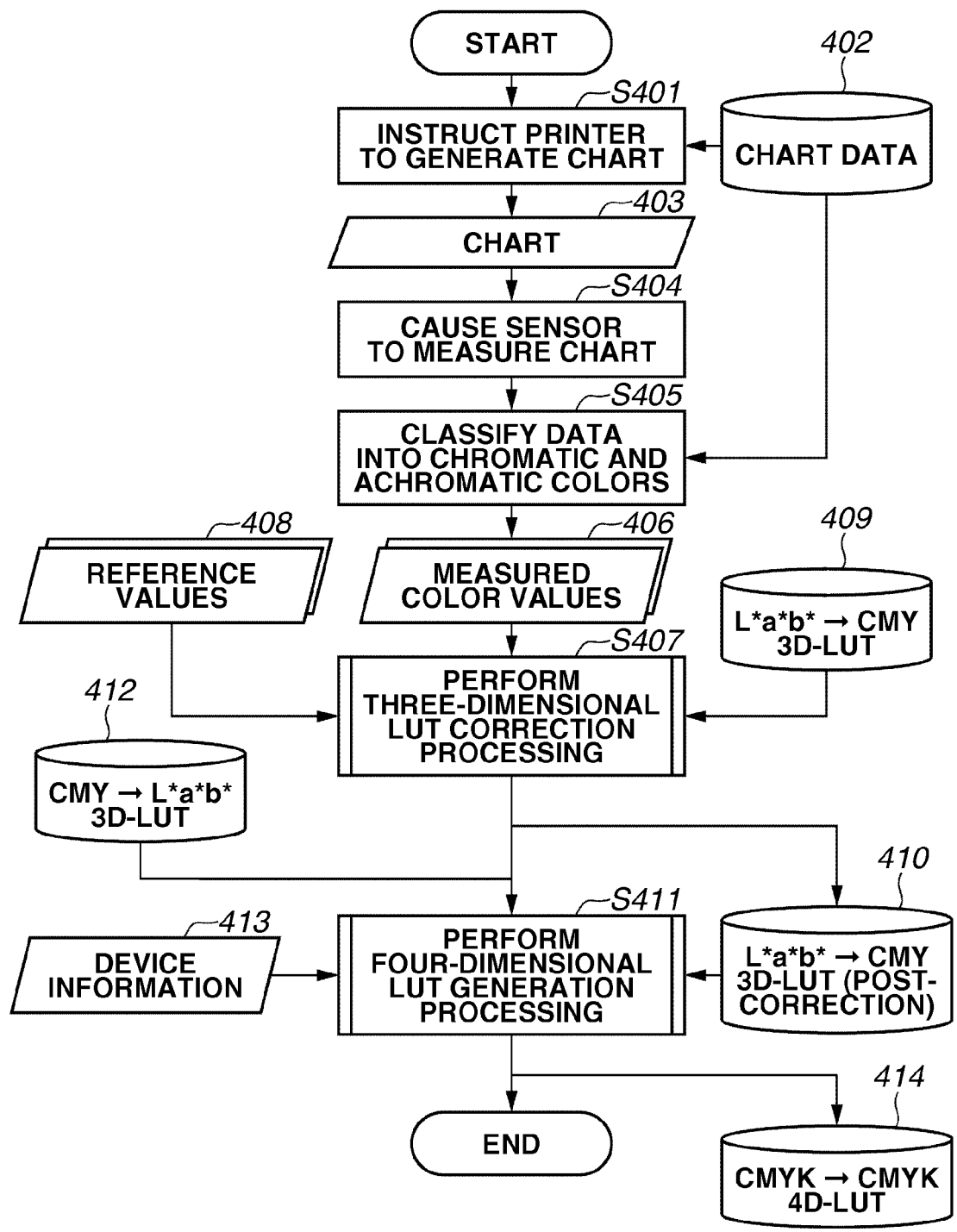
FIG. 4 is a flowchart illustrating an example procedure of mixed (or compound) color calibration processing according to an exemplary embodiment of the present invention.

FIG. 4 illustrates an example procedure of 4D-LUT generation processing. First, in step S401, the controller 102 acquires chart data (i.e., target data) 402 from the storage device 121. Then, the controller 102 outputs an instruction to the printer 115 to generate a chart 403. An example method for generating the chart data 402 is described in detail below.

Then, in step S404, the controller 102 outputs an instruction to the measurement unit 126 to cause the sensor 127 to measure the chart 403 and obtain L*a*b* values. Next, in step S405, the controller 102 receives patch data (i.e., measurement data representing patches on the chart) via the measurement unit 126 and classifies the received patch data into chromatic and achromatic colors to obtain measured color values 406. Further, the controller 102 stores the measured color values 406 in the storage device 121.

The classification method according to an exemplary embodiment can include adding information indicating the chromatic color or the achromatic color beforehand to the chart data 402, or can include determination based on an analysis on a numerical value of the chart data or measured patch data.

Next, the controller 102 reads the measured color values 406, reference values 408, and an L*a*b*→CMY 3D-LUT 409 from the storage device 121. Then, in step S407, the controller 102 performs three-dimensional LUT correction processing, and outputs an L*a*b*→CMY 3D-LUT (post-correction) 410.

The three-dimensional LUT correction processing to be performed in step S407 is described in detail below. The reference values 408 are target L*a*b* values, which are determined for each of the chromatic color and the achromatic color. The L*a*b*→CMY 3D-LUT 409 is a color conversion LUT that can be generated using a known method. The data described in the L*a*b*→CMY 3D-LUT 409 are device-unique CMY values that correspond to L*a*b* values disposed at predetermined intervals in a square-block pattern. The L*a*b*→CMY 3D-LUT 409 can be referred to when the controller 102 performs an interpolation calculation on arbitrary L*a*b* values to output corresponding CMY values.

Finally, in step S411, the controller 102 generates a CMYK→CMYK 4D-LUT 414 using a CMY→L*a*b* 3D-LUT 412, the L*a*b*→CMY 3D-LUT (post-correction) 410, and device information 413. The four-dimensional LUT generation processing to be performed in step S411 is described below. The CMY→L*a*b* 3D-LUT 412 is a color conversion LUT that can be generated using a known method. The data described in the CMY→L*a*b* 3D-LUT 412 are L*a*b* values that correspond to CMY values disposed at predetermined intervals in a square-block pattern. The CMY→L*a*b* 3D-LUT 412 can be referred to when the controller 102 performs an interpolation calculation on arbitrary CMY values to output corresponding L*a*b* values.

Next, the three-dimensional LUT correction processing to be performed in step S407 is described in detail below with reference to FIG. 5. First, in step S501, the controller 102 calculates difference data 510 for each of the chromatic color data and the achromatic color data with reference to the measured color values 406 and the reference values 408 acquired from the storage device 121. The total number of the difference data 502 calculated by the controller 102 is equal to the number of patches included in the chart data 402. The difference data 502 are classified into the chromatic color and the achromatic color.

Next, in step S502, the controller 102 reads the L*a*b*→CMY 3D-LUT 409 from the storage device 121 and extracts grid point data (L*a*b*). Further, the controller 102 determines whether the extracted grid point data is the chromatic color data or the achromatic color data. An example determination method is described below. Two values a* and b* are data representing hue/saturation information. Therefore, the controller 102 identifies the extracted grid point data as the achromatic color data if the values a* and b* are close to 0. For example, another determination method according to the present exemplary embodiment may include setting an appropriate threshold value. The data determined by the controller 102 in step S502 is grid point data (L*a*b* and chromatic/achromatic information) 503.

It is now assumed, with respect to L*a*b* data, that L* is in the range from 0 to 100, each of a* and b* is in the range from −128 to 128, and the number of grid points is 33×33×33. In this case, L* increases uniformly in increments of approximately 3, while each of a* and b* increases uniformly in increments of 8.

More specifically, the grid point data extracted in step S502 is one of 35,937 (=33×33×33) pieces of data, which is discretely distributed in the range from (L*, a*, b*)=(0, −128, −128) to (L*, a*, b*)=(100, 128, 128). Further, the grid point data extracted in step S502 includes additional information indicating that the grid point data is the chromatic color data or the achromatic color data.

Next, in step S504, the controller 102 calculates the distance between the grid point data (L*a*b* and chromatic/achromatic information) 503 and the reference values 408. Then, in step S505, the controller 102 extracts difference data whose distance is less than a predetermined threshold and determines a correction amount of the grid point data (L*a*b* and chromatic/achromatic information) 503 based on the extracted difference data.

In this case, the controller 102 performs extraction processing using chromatic color difference data if the color is the chromatic color or achromatic color difference data if the color is the achromatic color, with reference to the chromatic/achromatic information of the grid point data. The difference data extracted in this case may be a plurality of pieces of difference data, including a data that is relatively close to and a data that is relatively far from the grid point data (L*a*b* and chromatic/achromatic information) 503.

The controller 102 determines the correction amount of the grid point data by performing weighted addition processing using the distance data calculated based on the difference data in such a way as to enhance the influence of the difference data positioned closely and weaken the influence of the difference data positioned far. If there is not any difference data whose distance is less than the predetermined threshold, the correction amount is equal to 0.

Next, in step S506, the controller 102 reflects the determined grid point correction amount in the grid point data (L*a*b* and chromatic/achromatic information) 503 and stores the reflected value as post-correction grid point data (L*a*b*) 507. Then, in step S508, the controller 102 determines whether the processing of all pieces of the grid point data has been completed. If it is determined that the processing of all pieces of the grid point data is not yet completed (NO in step S508), then in step S502, the controller 102 extracts new grid point data and repeats the above-described processing on the newly extracted grid point data. If it is determined that the processing of all pieces of the grid point data has been completed (YES in step S508), then in step S509, the controller 102 performs interpolation calculation processing.

In a state where the processing of all pieces of the grid point data is completed, the number of the generated post-correction grid point data (L*a*b*) 507 is equal to the number of the grid points. The controller 102 performs an interpolation calculation on the generated data using the L*a*b*→CMY 3D-LUT 409 to calculate new CMY values. The controller 102 stores the calculated CMY values as output values of the original grid point data and generates the L*a*b*→CMY 3D-LUT (post-correction) 410.

Determining the correction amount with reference to the difference data that is present within a predetermined distance from the grid point as described above is useful in that the correction amounts for many grid point data can be determined using a smaller number of data. The method for correcting the L*a*b*→CMY 3D-LUT 409 is not limited to the example described in the present exemplary embodiment and any other appropriate method is employable.

Next, an example of the four-dimensional LUT generation processing to be performed in step S411 is described below with reference to FIG. 6. First, in step S601, the controller 102 extracts CMY values from CMYK equalized data 602. In the present exemplary embodiment, the number of the CMYK equalized data is equal to the number of the grid points of the CMYK→CMYK 4D-LUT 414. Further, the CMYK equalized data is not different in the interval of data.

For example, if the number of grid points of the CMYK→CMYK 4D-LUT 414 is 4,096 (=8×8×8×8), the number of the CMYK equalized data 602 is equal to 4,096. If the expression of data is 8-bit (0 to 255), the interval of the data is equal to approximately 36.

Next, in step S603, the controller 102 determines CMY values by performing an interpolation calculation using the CMY→L*a*b* 3D-LUT 412 and the L*a*b*→CMY 3D-LUT (post-correction) 410. First, the controller 102 obtains L*a*b* values based on the extracted CMY values by performing an interpolation calculation using the CMY→L*a*b* 3D-LUT 412. Then, the controller 102 calculates CMY values based on the calculated L*a*b* values by performing an interpolation calculation using the L*a*b*→CMY 3D-LUT (post-correction) 410.

Next, in step S604, the controller 102 extracts a K value from the CMYK equalized data 602 and combines the extracted K value with the above-described calculated CMY values to generate CMYK values 605. The K value extracted in step S604 corresponds to the CMY values extracted in step S601.

Then, in step S606, the controller 102 performs application amount restriction processing with reference to the device information 413. The device information 413 is a numerical value that represents the amount of a toner applicable to the printer 115. In the present exemplary embodiment, the device information 413 is referred to as "application amount." For example, in the case of CMYK data, the maximum settable signal value is 400% if the maximum value of a single color is 100%. However, the total number of the applicable toner is 300%, the application amount is equal to 300%.

The CMYK values 605 may exceed a predetermined application amount depending on the combination thereof. Therefore, the controller 102 performs known UCR processing for the application amount restriction processing. The UCR processing includes replacing CMY toners with a K toner. According to a method, it is feasible to express the key tone using the CMY toners equally. According to another method, it is feasible to express the key tone using the K toner only. The method using only the K toner is advantageous in that the application amount can be reduced although the density decreases, compared to the method using the CMY toners.

Then, in step S607, the controller 102 performs pure colorization processing to generate CMYK values (post-correction) 608. For example, when a correction using the CMYK→CMYK 4D-LUT 414 is performed, it is ideal to output C single color if the data is the C single color. To this end, the controller 102 changes the CMYK values to pure color data with reference to the original CMYK equalized data 602 if the original CMYK equalized data 602 is pure color data. For example, if an M value is included in the CMYK values (post-correction) 608 when the CMYK equalized data 602 is the C single color, the controller 102 changes the M value to 0.

Then, in step S609, the controller 102 stores the CMYK values (post-correction) 608 in the CMYK→CMYK 4D-LUT 414. Finally, in step S610, the controller 102 determines whether the processing of all pieces of the CMYK equalized data 602 has been completed. If it is determined that the processing of all pieces of the CMYK equalized data 602 is not yet completed (NO in step S610), the controller 102 extracts CMY values from the remaining CMYK equalized data 602 and repeats the above-described processing for the newly extracted CMY values. If it is determined that the processing of all pieces of the CMYK equalized data 602 has been completed (YES in step S610), the controller 102 terminates the processing of the flowchart illustrated in FIG. 6. In other words, the controller 102 can obtain the completed CMYK→CMYK 4D-LUT 414.

The number of grid points of the LUT is not limited to the above-described example and any other value is employable for the present exemplary embodiment. Further, any LUT having a special configuration is employable. For example, if the CMYK→CMYK 4D-LUT 414 is modified to have a special configuration, the number of grid points of C may not be equal to the number of grid points of M.

Figure 7:
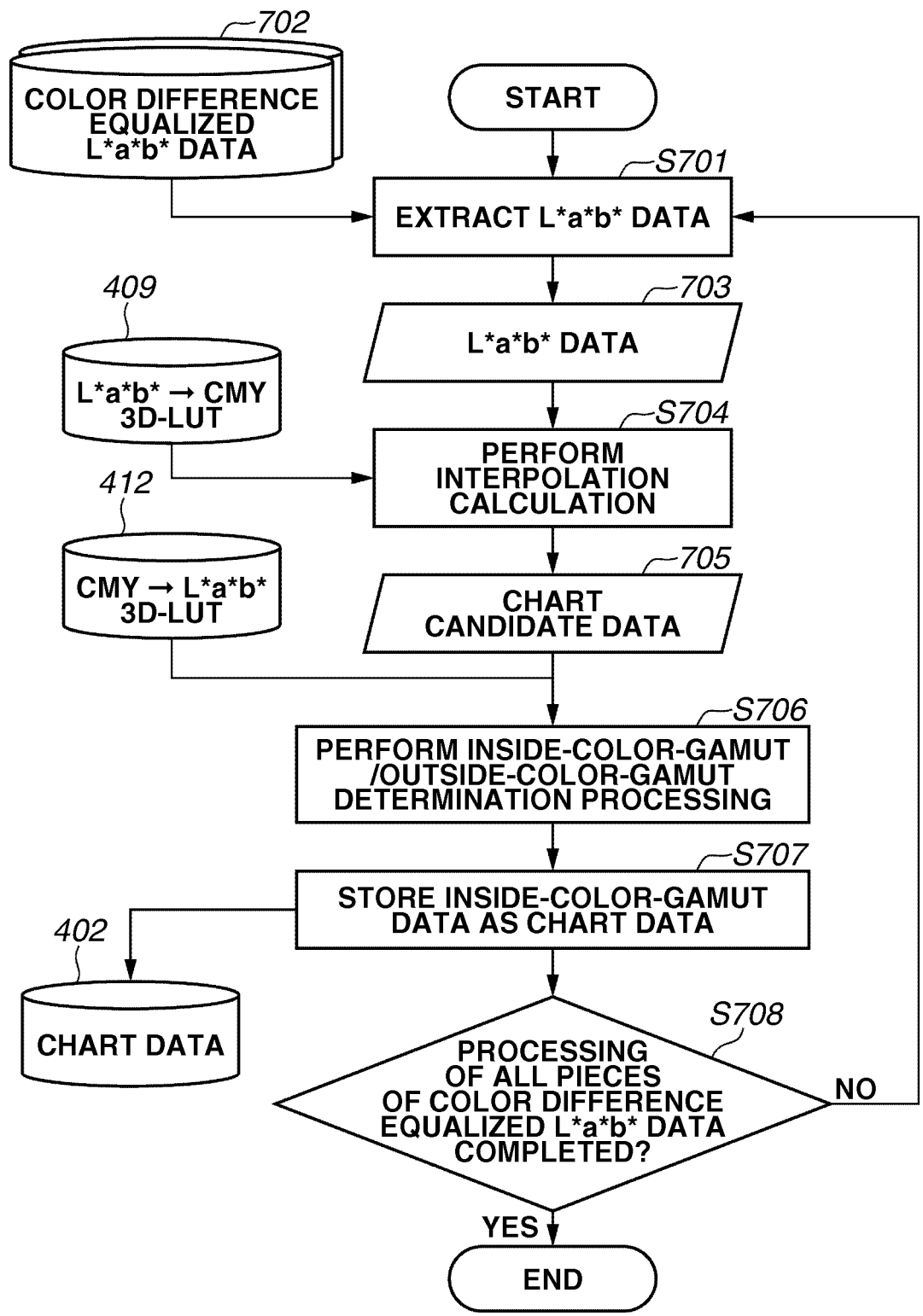
FIG. 7 is a flowchart illustrating an example procedure of conventional chart data generation processing.

FIG. 7 illustrates an example procedure of conventional processing for generating the chart data 402. The following processing begins with an instruction from the CPU 103 of the controller 102. First, in step S701, the controller 102 extracts L*a*b* data 703 from color difference equalized L*a*b* data 702 stored in the storage device 121. The color difference equalized L*a*b* data 702 is obtainable by segmenting an L*a*b* data region at predetermined intervals.

Next, in step S704, the controller 102 generates chart candidate data (CMY) 705 by performing interpolation calculation using the L*a*b* data 703 and the L*a*b*→CMY 3D-LUT 409 stored in the storage device 121. Further, in step S706, the controller 102 performs inside-color-gamut/outside-color-gamut determination processing on the chart candidate data (CMY) 705.

According to an example inside-color-gamut determination method, the controller 102 calculates L*a*b* values by performing an interpolation calculation on the chart candidate data (CMY) 705 with reference to the CMY→L*a*b* 3D-LUT 412. The controller 102 determines whether the difference between the L*a*b* values and the L*a*b* data 703 is less than a predetermined threshold. If the difference is less than the threshold, the controller 102 determines that the L*a*b* values are in the color gamut. If the difference is greater than the threshold, the controller 102 determines that the L*a*b* values are outside the color gamut.

In step S707, the controller 102 extracts inside-color-gamut data and stores the extracted data as the chart data 402. Finally, in step S708, the controller 102 determines whether the processing of all pieces of color difference equalized L*a*b* data has been completed. If it is determined that the processing of all pieces of color difference equalized L*a*b* data has been completed (YES in step S708), the controller 102 terminates the processing of the flowchart illustrated in FIG. 7. If it is determined that the processing of all pieces of color difference equalized L*a*b* data is not yet completed (NO in step S708), the controller 102 repeats the processing of step S701 and the subsequent steps.

When the chart data 402 is generated according to the above-described conventional processing, a problem may occur if the sensors 301 to 304 illustrated in FIG. 3 are used to read the chart data 402. The sensor 301 to 304 may output different measurement results even if the read data is the same, due to setup accuracy and individual differences. Especially, the influence of the differences in the measurement result becomes remarkable when the 4D-LUT is used to correct a mixed (or compound) color, as described in detail below with reference to FIG. 8 and FIG. 9.

Figure 8:
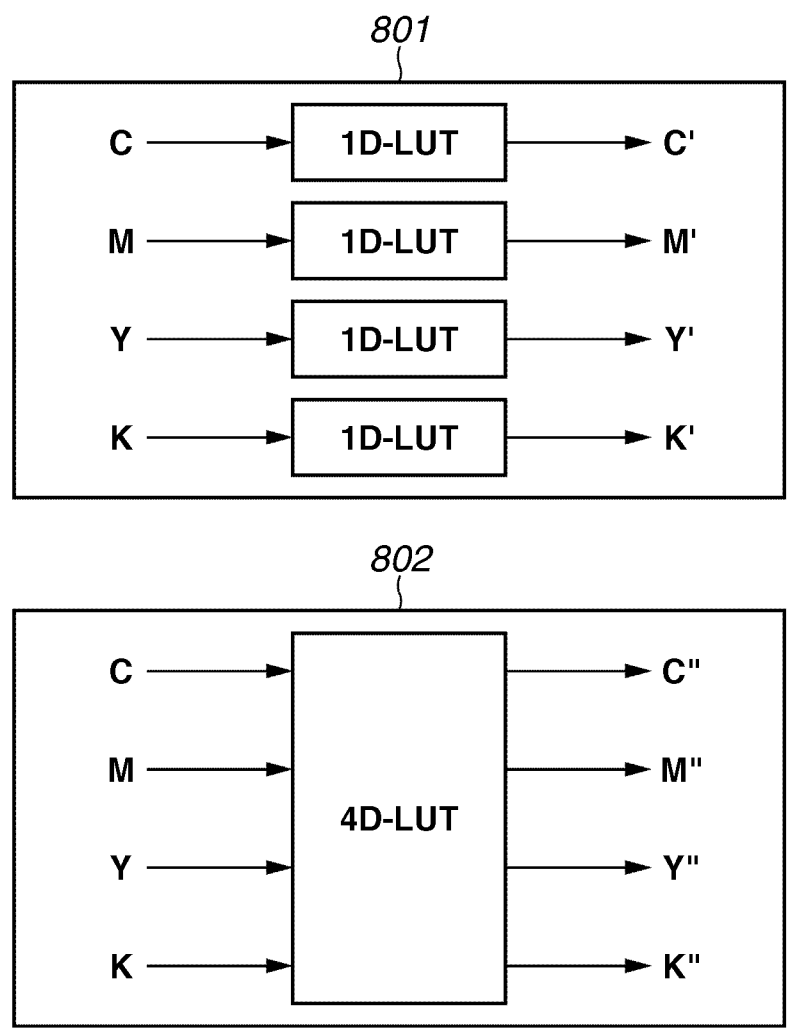
FIG. 8 illustrates differences between single color correction processing and mixed (or compound) color correction processing.

FIG. 8 illustrates an example configuration 801 that corresponds to the 1D-LUT correction processing to be performed in step S213, in which respective C, M, Y, and K data are converted into corresponding C', M', Y', and K' data via a plurality of independent 1D-LUTs. Therefore, for example, the sensor 301 can be allocated to C data and the sensor 302 can be allocated to M data. Namely, it is feasible to allocate a dedicated sensor to each toner color (i.e., for each 1D-LUT). Thus, even when there are individual differences between respective sensors, it is feasible to maintain the gradation characteristics of each color although the actual values deviate from the target values.

FIG. 8 illustrates an example configuration 802 that corresponds to the 4D-LUT correction processing to be performed in step S212, in which a single 4D-LUT is used to convert a mixed or compound color (i.e., a specific combination of C, M, Y, and K) into another mixed (or compound) color of C", M", Y", and K". Therefore, it is difficult to allocate a dedicated sensor to each toner color. FIG. 9 illustrates a table 901 indicating a problem that may occur in the 4D-LUT correction processing when the sensors have individual differences.

The table 901 illustrated in FIG. 9 is a graph representing a relationship between an input signal value (in the abscissa axis) and a density value (in the ordinate axis). Although an actual output of each sensor is L*a*b* values, the following example describes only the density value to simplify the description.

A straight line 902 indicates an ideal density value that corresponds to each input signal value. The ideal characteristics 902 can be obtained when the sensor 301 to the sensor 304 have no individual differences. A curve 903 indicates actual characteristics obtained when the sensor 301 to the sensor 304 have individual differences. A region 904 covers density values detected by the sensor 301, a region 905 covers density values detected by the sensors 302, and a region 906 covers density values detected by the sensor 303.

The tendency of the individual differences is not always the same. Therefore, the actual density value may be greater than the ideal density value in some cases and may be less than the ideal density value in some cases. According to the example illustrated in FIG. 9, the density values detected by the sensor 301 are greater than the ideal values. The density values detected by the sensor 302 are smaller than the ideal values. The density values detected by the sensor 303 are greater than the ideal values.

If the above-described phenomenon occurs, the continuity of data will be lost. Deterioration in gradation characteristics may cause a problem (e.g., gradation gap). Serious deterioration may occur in image quality.

A table 907 illustrated in FIG. 9 is a graph representing another relationship between an input signal value (in the abscissa axis) and a density value (in the ordinate axis). A straight line 908 indicates an ideal density value that corresponds to each input signal value. The table 907 is different from the above-described table 901 in that a straight line 909 indicates characteristics obtained by a single sensor.

A region 910 covers density values detected by the sensor 301. Although the density values detected by the sensor 301 deviate from the ideal characteristics, the above-described serious problem (e.g., gradation gap) does not occur when only one sensor is used. In view of the foregoing, the system according to the present exemplary embodiment is configured to analyze and classify characteristics of the chart data in such a way as to eliminate the above-described serious deterioration in image quality.

Figure 10:
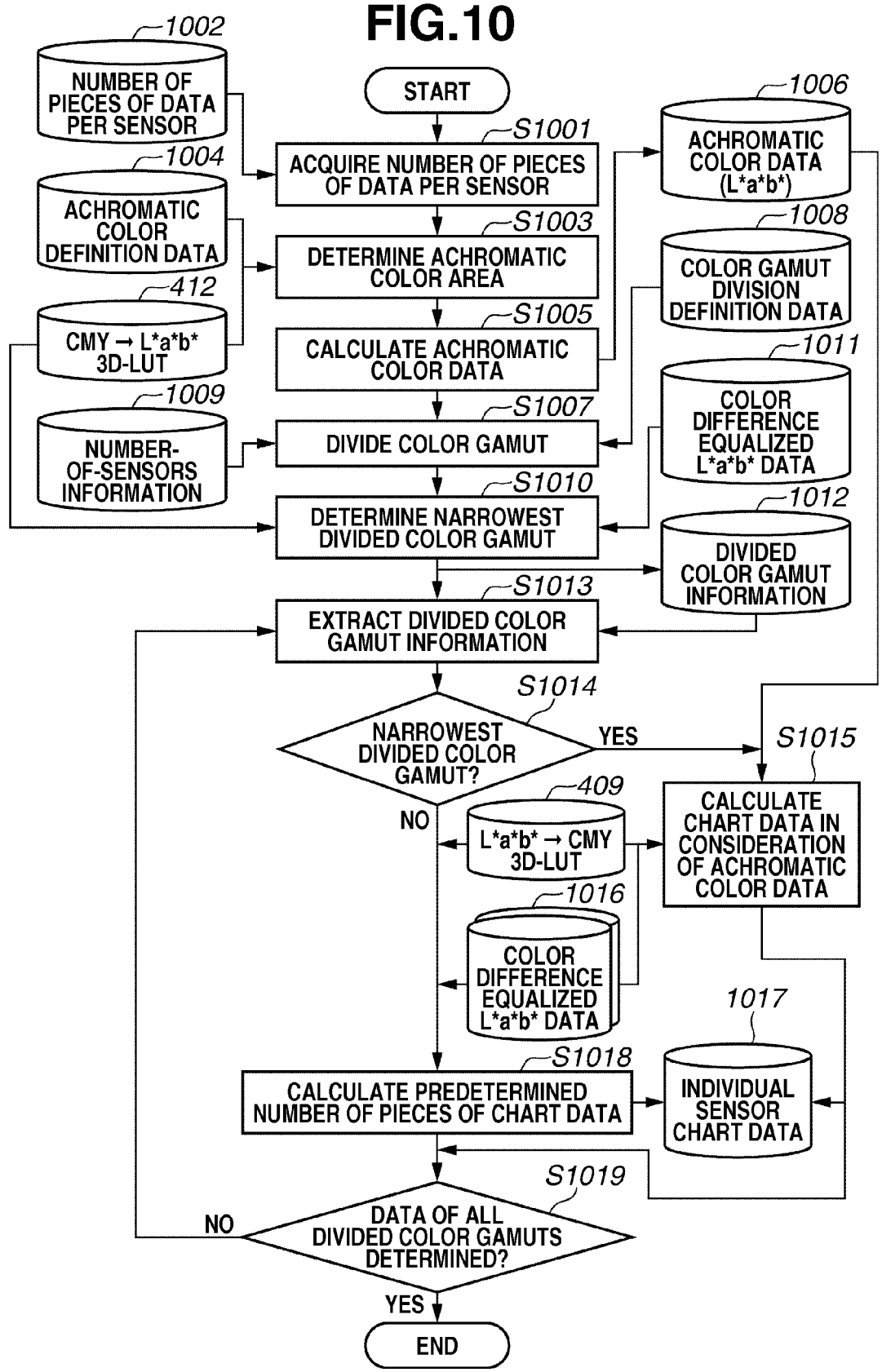
FIG. 10 is a flowchart illustrating an example procedure of chart data generation processing according to a first exemplary embodiment of the present invention.

FIG. 10 is a flowchart illustrating an example procedure of chart data generation processing according to a first exemplary embodiment of the present invention. The following processing begins with an instruction from the CPU 103 of the controller 102. In step S1001, the controller 102 acquires the number-of-patch data from the number of patches 1002 that can be measured by a single sensor from the storage device 121. It is useful to dispose the chart data as illustrated in FIG. 3 so that the number of patches disposed on a sheet of paper can be maximized. The number of sheets required to print the chart data can be reduced. The sensor arrangement illustrated in FIG. 3 is useful in that each sensor can measure the same number of patches.

For example, in a case where the number of patches to be printed on a sheet of paper is 80, each sensor is required to measure 20 patches in total if there are four sensors. In this case, 20 patches are arrayed in a straight line along the sheet conveyance direction so that the sensor 301 illustrated in FIG. 3 can perform patch measurement. Similarly, 20 patches are arrayed for each of the remaining sensors 302 to 304, so that each sensor can perform measurement of patch data. Thus, the controller 102 completes the generation of the chart data for respective sensors 301 to 304.

Figure 11:
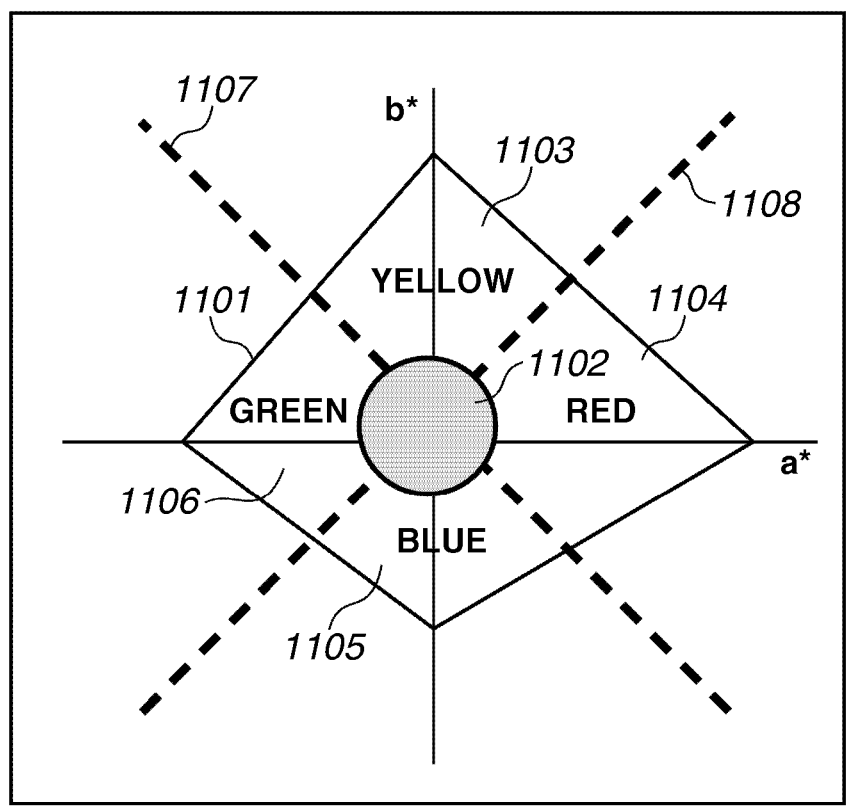
FIG. 11 illustrates an example division of a color gamut according to the first exemplary embodiment of the present invention.

Next, in step S1003, the controller 102 acquires achromatic color definition data 1004 and the CMY→L*a*b* 3D-LUT 412 from the storage device 121. FIG. 11 illustrates an example. The achromatic color definition data 1004 is L*a*b* values serving as achromatic color data candidate.

FIG. 11 illustrates a color region 1101 that is obtainable from the CMY→L*a*b* 3D-LUT 412 and can be reproduced by the printer 115. The color region 1101 is generally expressed as three-dimensional information of L*a*b*, although FIG. 11 illustrates the color region 1101 projected on the a*-b* plane. The red color is reproducible when the value a* increases. The green color is reproducible when the value a* decreases. The yellow color is reproducible when the value b* increases. The blue color is reproducible when the value b* decreases. Further, FIG. 11 illustrates an achromatic color area 1102, in which the values a* and b* are close to 0.

Next, in step S1005, the controller 102 calculates achromatic color data (L*a*b*) with reference to the achromatic color definition data 1004 and the CMY→L*a*b* 3D-LUT 412. If the value L* of the data is extremely brighter or darker, the printer 115 cannot reproduce the color data. Therefore, the controller 102 determines whether the data is reproducible, from the view point of L*, with reference to the CMY→L*a*b* 3D-LUT 412.

Next, in step S1007, the controller 102 divides the color gamut with reference to color gamut division definition data 1008 and number-of-sensors information 1009, which are acquired from the storage device 121.

The example illustrated in FIG. 11 includes color gamut division definition data 1107 and 1108, which are expressed as straight lines extending on the a*-b* plane, according to the present exemplary embodiment. Two straight lines (i.e., the color gamut division definition data) 1107 and 1108 obtains four areas (i.e., yellow area 1103, red area 1104, blue area 1105, and green area 1106) from a data region obtainable by excluding the achromatic color area 1102 from the color gamut 1101. The total number of the divided areas corresponds to the number-of-sensors information (i.e. four sensors 301 to 304). The color gamut division definition data 1107 and 1008 are not limited to the above-described straight lines and can be any other complicated data (e.g., curves).

Next, in step S1010, the controller 102 reads color difference equalized L*a*b* data 1011 from the storage device 121 and determines the narrowest divided color gamut. Further, the controller 102 outputs divided color gamut information 1012. More specifically, the controller 102 performs the inside-color-gamut/outside-color-gamut determination processing on the color difference equalized L*a*b* data 1011 for each of the yellow area 1103, the red area 1104, the blue area 1105, and the green area 1106. The controller 102 performs the determination based on the number of patches existing in the color gamut. A plurality of pieces of divided color gamut information 1012 is defined independently. The total number of the plurality of pieces of divided color gamut information 1012 is equal to the number of the sensors. Each includes information indicating whether the divided color gamut is the narrowest area.

In step S1013, the controller 102 extracts the divided color gamut information 1012. Then, in step S1014, the controller 102 determines whether the divided color gamut information extracted in step S1013 is the narrowest division color gamut. If it is determined that the extracted divided color gamut information is not the narrowest division color gamut (NO in step S1014), then in step S1018, the controller 102 generates individual sensor chart data 1017 with reference to the divided color gamut information 1012, the L*a*b*→CMY 3D-LUT 409, and color difference equalized L*a*b* data 1016.

First, the controller 102 extracts in-color gamut L*a*b* data from the color difference equalized L*a*b* data 1016 with reference to the divided color gamut information 1012.

Next, the controller 102 calculates CMY values of the chart data with reference to the extracted L*a*b* data and the L*a*b*→CMY 3D-LUT 409. A plurality of pieces of data that are different in the interval is prepared beforehand as the color difference equalized L*a*b* data 1016. If the number of patches is different from the number of patches 1002 per sensor, the controller 102 reads another color difference equalized L*a*b* data 1016 that is different in the interval and repeats the above-described processing until a determined number of patches can be obtained.

If it is determined that the divided color gamut information extracted in step S1013 is the narrowest division color gamut (YES in step S1014), then in step S1015, the controller 102 generates the individual sensor chart data 1017 in consideration of the achromatic color data.

More specifically, achromatic color data (L*a*b*) 1006 determines the number of achromatic color patches. Therefore, the controller 102 calculates the chart data in the color gamut in such a manner that the total number including the number of achromatic color patches becomes equal to the number of patches per sensor. In general, the achromatic color data has a limited area. Therefore, the number of patches of the achromatic color data becomes smaller than that of the chromatic color data.

Hence, in the present exemplary embodiment, the controller 102 allocates the achromatic color data to a specific sensor, to which a narrow color gamut smallest in the number of pieces of the data is allocated. Needless to say, a single sensor can be allocated to each achromatic color. Finally, in step S1019, the controller 102 determines whether data of all divided color gamuts has been determined. If the data of all divided color gamuts is not yet determined, the controller 102 repeats the processing in step S1013 and subsequent steps.

Figure 12:
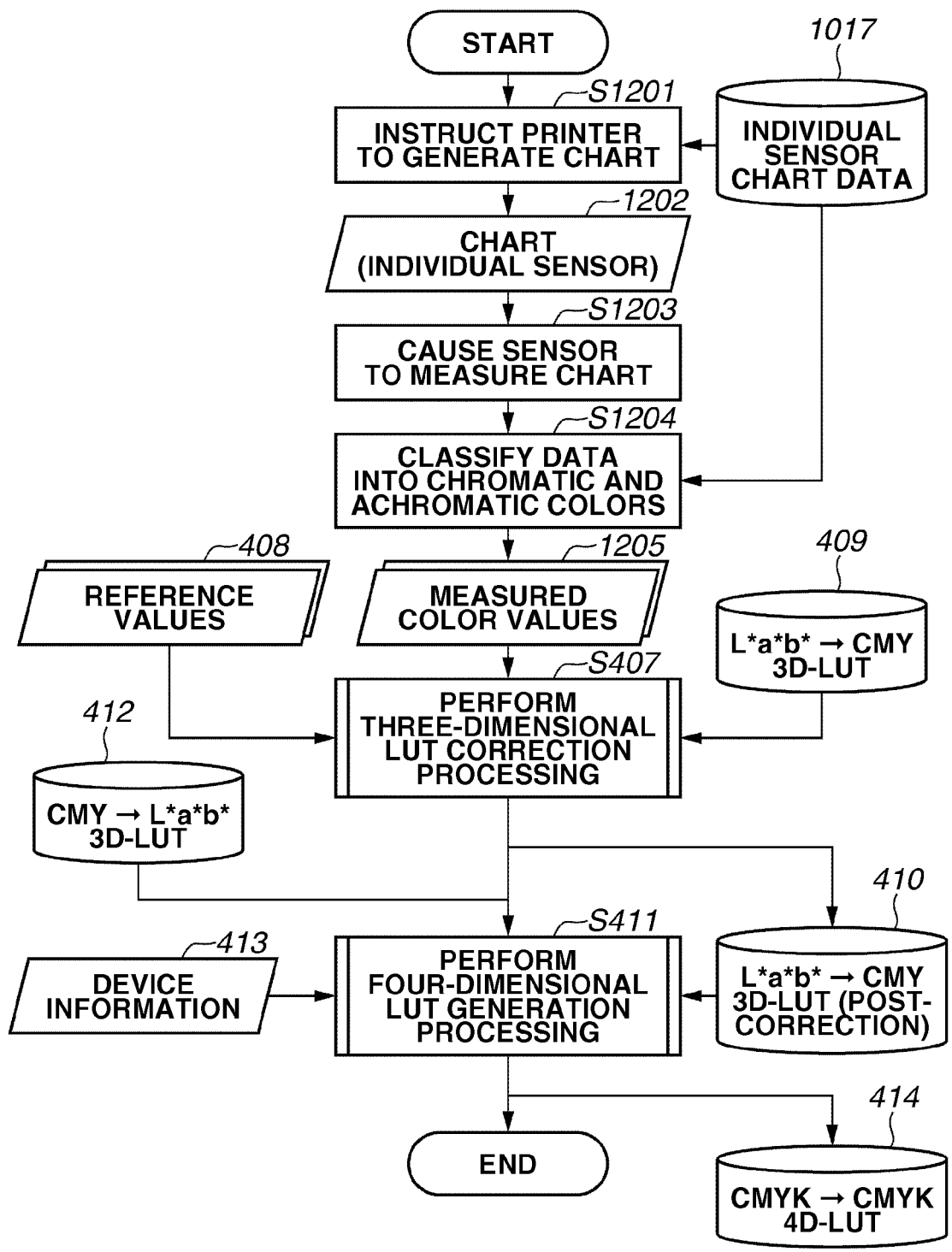
FIG. 12 is a flowchart illustrating an example procedure of mixed (or compound) color calibration processing according to the first exemplary embodiment of the present invention.

FIG. 12 illustrates an example procedure of processing for generating the 4D-LUT with reference to the individual sensor chart data 1017. The following processing begins with an instruction from the CPU 103 of the controller 102. First, in step S1201, the controller 102 reads the individual sensor chart data 1017 from the storage device 121 and outputs an instruction to the printer to output a chart (individual sensor) 1202.

The chart (individual sensor) 1202 includes chart data classified depending on the hue and allocated to respective sensors, as illustrated in FIG. 11. More specifically, the chart illustrated in FIG. 3 includes patches 307 to 309 having similar values in hue so that the sensor 301 can read these patches 307 to 309. Similarly, patches 310 to 312 have similar values in hue so that the sensor 302 can read these patches 310 to 312. The chart illustrated in FIG. 3 further includes patches 313 to 315 having similar values in hue so that the sensor 303 can read these patches 313 to 315. Similarly, patches 316 to 318 have similar values in hue so that the sensor 304 can read these patches 316 to 318. Thus, a plurality of patches having similar hue values can be read by the same sensor.

Next, in step S1203, the controller 102 causes the sensor to perform a measurement. Then, in step S1204, the controller 102 classifies the data into the chromatic color and the achromatic color with reference to information relating to the individual sensor chart data 1017, and obtains measured color values 1205. Processing to be performed in step S407 and step S411 is similar to the processing in the flowchart illustrated in FIG. 4 and, therefore, the description thereof is not repeated.

In the present exemplary embodiment, the chart data is classified in consideration of hue. However, it is useful to classify the chart data in consideration of lightness or saturation. Further, it is useful to classify the chart data in consideration of a combination of hue, lightness, and saturation. For example, it is useful to allocate a sensor to a low-lightness portion and allocate another sensor to a high-saturation portion other than the low-lightness portion. Further, it is useful to divide an area other than the low-lightness portion and the high-saturation portion into half areas in consideration of hue and allocate an independent sensor to each of the divided areas.

Further, the input device 120 is available to switch the concept with respect to the classification. Although the above-described system according to the present exemplary embodiment discriminates between the chromatic color and the achromatic color, it may be unnecessary to discriminate between the chromatic color and the achromatic color in the processing if it is acceptable.

Although the above-described system according to the present exemplary embodiment uses the 4D-LUT to correct mixed (or compound) colors, it is useful to provide an appropriate unit configured to reflect measurement data of the mixed (or compound) colors in a matrix or the 1D-LUT. Although the above-described system according to the present exemplary embodiment causes the controller 102 to generate the chart data, it is useful to configure the PC to perform the processing illustrated in FIG. 10 to generate the individual sensor chart data 1017.

Although the above-described system according to the present exemplary embodiment uses the data defined in the device-independent color space (e.g., L*a*b* or XYZ), it is useful to provide an appropriate unit configured to acquire luminance or reflectance values and convert the acquire data into device-independent L*a*b* or XYZ data.

According to the present exemplary embodiment, when a system is configured to correct mixed (or compound) colors with reference to measured color values obtained by a plurality of sensors, the system can generate chart data in such a way as to allow the same sensor to measure density patches for each color gamut even when respective sensors have individual differences. Thus, it becomes feasible to correct the mixed (or compound) colors adequately while reducing adverse influences on the image quality relating to gradation characteristics even when the sensors have individual differences.

Next, a system according to a second exemplary embodiment of the present invention that provides margin areas when a color gamut is divided is described below. The above-described system according to the first exemplary embodiment calculates individual sensor chart data with reference to the number of sensors and device color gamut information, and performs the 4D-LUT generation processing based on the calculated individual sensor chart data. The system according to the second exemplary embodiment performs processing using margin areas, as described below.

Figure 13:
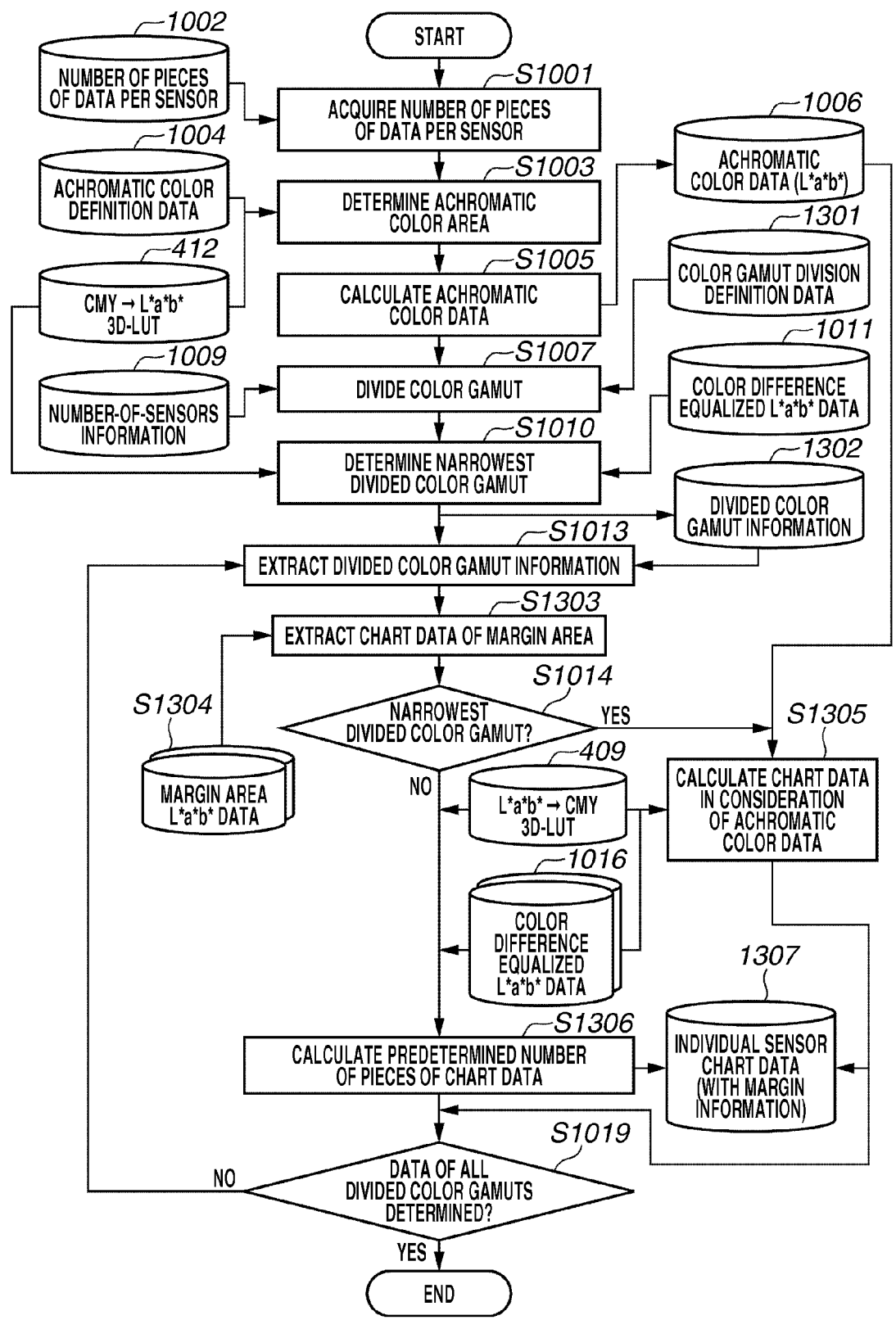
FIG. 13 is a flowchart illustrating an example procedure of chart data generation processing according to a second exemplary embodiment of the present invention.

FIG. 13 illustrates an example procedure of processing for generating individual sensor chart data using margin areas. The following processing begins with an instruction from the CPU 103 of the controller 102.

Figure 14:
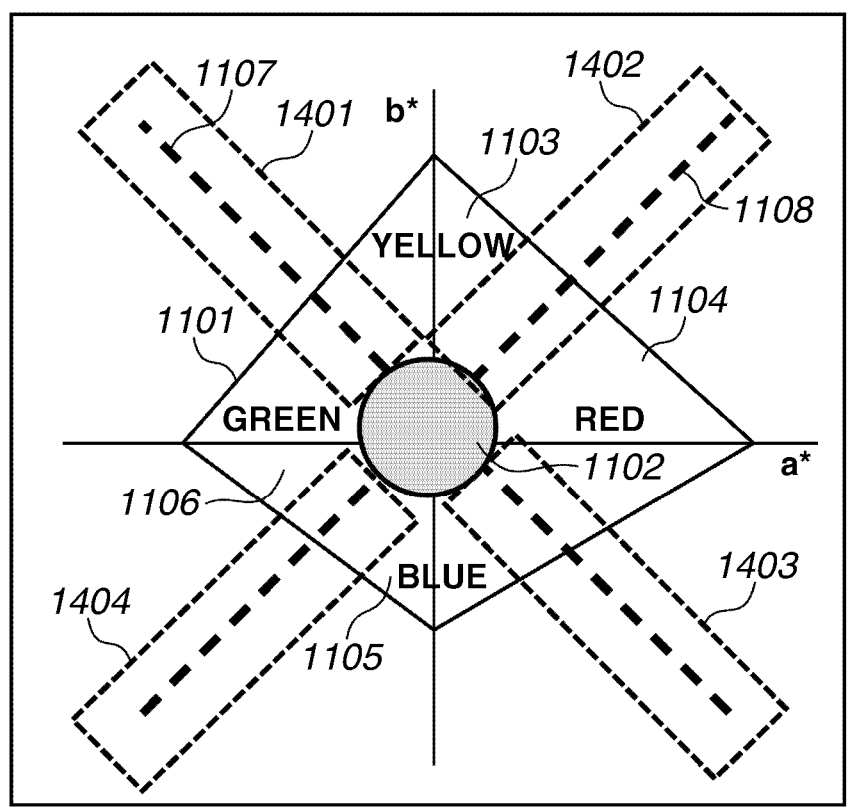
FIG. 14 illustrates an example division of a color gamut according to the second exemplary embodiment of the present invention.

FIG. 14 illustrates example margin areas. The example illustrated in FIG. 14 includes a plurality of margin areas, which are not provided in the example illustrated in FIG. 11. More specifically, the newly added margin areas are a margin area 1401, a margin area 1402, a margin area 1403, and a margin area 1404, which are provided between two neighboring areas respectively.

For example, the margin area 1401 extends between the yellow area 1103 and the green area 1106. In this case, patches in the margin area 1401 can be measured not only by the sensor dedicated to the yellow area 1103 but also by the sensor dedicated to the green area 1106. Averaging the values measured by two sensors is useful to reduce the gap between two neighboring areas that may be generated when the sensors have individual differences. In this manner, the system according to the present exemplary embodiment can effectively prevent the image quality from deteriorating.

First, processing to be performed in steps S1001 to S1013 is similar to the processing in the flowchart illustrated in FIG. 10 and, therefore, the description thereof is not repeated. In the present exemplary embodiment, color gamut division definition data 1301 includes the margin areas illustrated in FIG. 14. Therefore, the size of the color gamut is wider because of an overlap area between two color gamuts, compared to the color gamut described in the first exemplary embodiment.

For example, the yellow area 1103 can be recognized as a single color gamut including both the margin area 1401 and the margin area 1402. The red area 1104 can be recognized as a single color gamut including both the margin area 1402 and the margin area 1403. The blue area 1105 can be recognized as a single color gamut including both the margin area 1403 and the margin area 1404. The green area 1106 can be recognized as a single color gamut including both the margin area 1404 and the margin area 1401.

Similarly, divided color gamut information 1302 includes the margin areas. More specifically, the controller 102 performs the inside-color-gamut/outside-color-gamut determination processing on the color difference equalized L*a*b* data 1011 for each color gamut that includes margin areas. The controller 102 performs the determination based on the number of patches existing in the color gamut. A plurality of pieces of divided color gamut information 1012 is defined independently. The total number of the plurality of pieces of divided color gamut information 1012 is equal to the number of the sensors. Each includes information indicating whether the divided color gamut is the narrowest area.

In step S1303, the controller 102 acquires corresponding margin area L*a*b* data 1304 with reference to divided color gamut information extracted from the storage device 121 in step S1013. According to the example illustrated in FIG. 14, the controller 102 acquires L*a*b* values that are set in the margin area 1401 and the margin area 1402 if the processing target is the yellow area 1103.

Then, similar to the processing illustrated in FIG. 10, in step S1014, the controller 102 determines whether the color gamut information extracted in step S1013 is the narrowest division color gamut. If it is determined that the color gamut information extracted in step S1013 is not the narrowest division color gamut (NO in step S1014), then in step S1306, the controller 102 calculates individual sensor chart data 1307 using the divided color gamut information 1012, the L*a*b*→CMY 3D-LUT 409, and the color difference equalized L*a*b* data 1016. The individual sensor chart data 1307 includes margin information.

First, the controller 102 extracts in-color gamut L*a*b* data from the color difference equalized L*a*b* data 1016 and the L*a*b* data extracted from the margin areas with reference to the divided color gamut information 1012. Then, the controller 102 calculates CMY values of the chart data with reference to the extracted L*a*b* data and the L*a*b*→CMY 3D-LUT 409. A plurality of pieces of data that are differentiated in the interval is prepared beforehand as the color difference equalized L*a*b* data 1016. If the number of pieces of the data is different from the number of patches 1002 per sensor, the controller 102 reads another color difference equalized L*a*b* data 1016 that is different in the interval and repeats the above-described processing until a determined number of pieces of data can be obtained.

If it is determined that the color gamut information extracted in step S1013 is the narrowest division color gamut (YES in step S1014), then in step S1305, the controller 102 calculates the individual sensor chart data 1307 by performing processing in consideration of the achromatic color in addition to the processing performed in step S1306. The processing to be performed in consideration of the achromatic color is similar to the processing in step S1015 illustrated in FIG. 10 and, therefore, the description thereof is not repeated.

Figure 15:
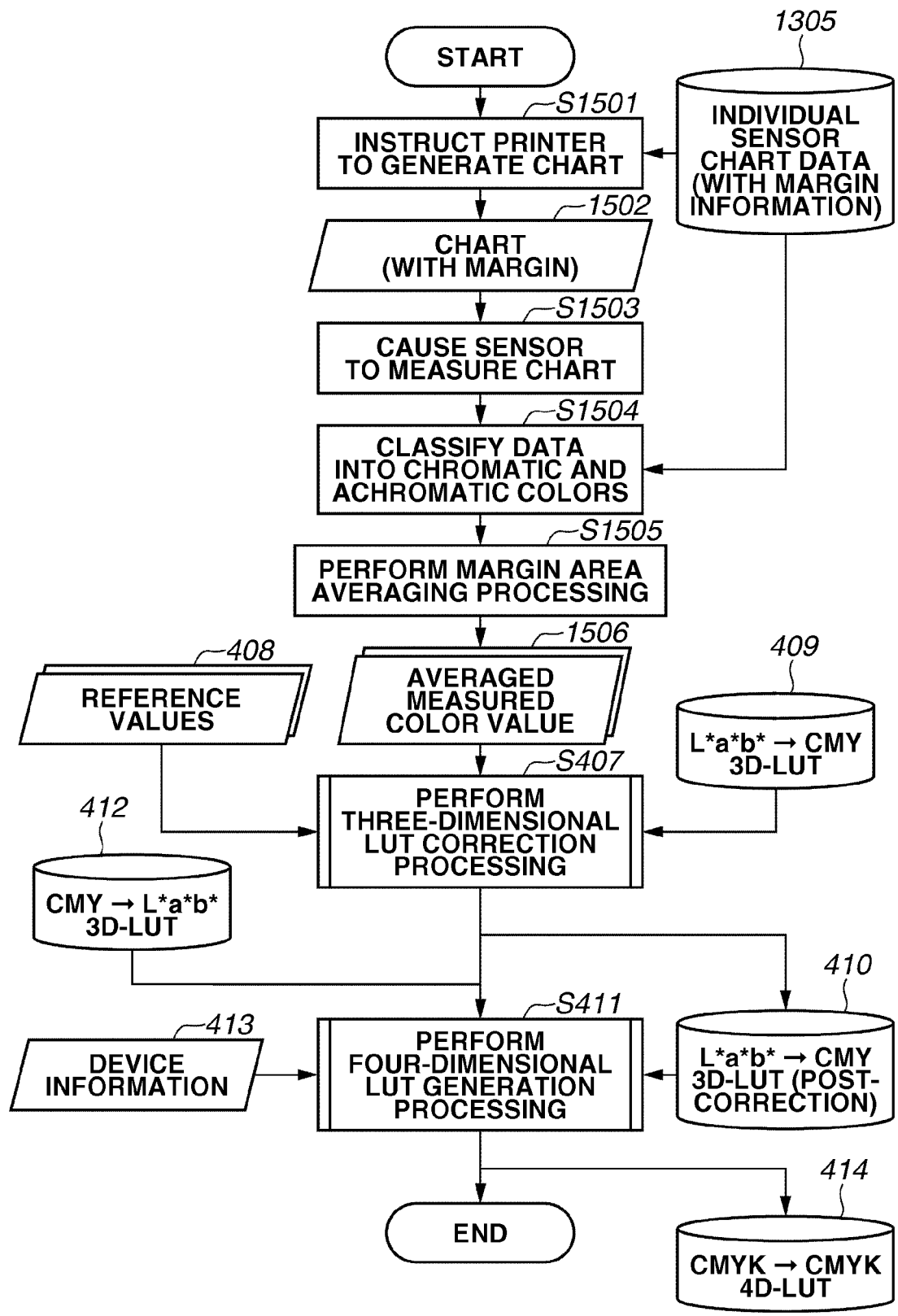
FIG. 15 is a flowchart illustrating an example procedure of mixed (or compound) color calibration processing according to the second exemplary embodiment of the present invention.

FIG. 15 illustrates an example procedure of processing for generating the 4D-LUT with reference to individual sensor chart data 1305 including margin information. The following processing begins with an instruction from the CPU 103 of the controller 102. First, the controller 102 reads the individual sensor chart data 1305 including the margin information from the storage device 121 and outputs an instruction to the printer to output a chart (with margin information) 1502.

The chart (individual sensor) 1502 includes the margin information data in addition to the chart data classified in consideration of hue and allocated to each sensor, as illustrated in FIG. 14. The margin information data corresponds to the areas 1401 to 1404 illustrated in FIG. 14. The margin information data have same signal values allocated to different sensors.

Next, in step S1503, the controller 102 causes the sensor to perform a measurement. Then, in step S1504, the controller 102 classifies the data into the chromatic color and the achromatic color with reference to the individual sensor chart data 1305 including the margin information, and obtains the measured color values 1205.

Next, in step S1505, the controller 102 obtains an averaged measured color value 1506 by performing averaging processing on margin area data extracted using the individual sensor chart data 1305 including the margin information.

Processing to be performed in step S407 and step S411 is similar to the processing in the flowchart illustrated in FIG. 4 and, therefore, the description thereof is not repeated. Averaging the measurement data in the margin areas is useful to reduce the gradation gap that may be generated at the boundary of two divided color gamuts. In this manner, the system according to the present exemplary embodiment can effectively prevent the image quality from deteriorating.

The method for setting the margin areas is not limited to the above-described method. Any other setting method is employable in the present exemplary embodiment. Further, it is not always required to provide the margin areas for all areas. Although the system according to the present exemplary embodiment discriminates between the chromatic color and the achromatic color, it may be unnecessary to discriminate between the chromatic color and the achromatic color in the processing if it is acceptable.

According to the present exemplary embodiment, when a system is configured to correct mixed (or compound) colors with reference to measured color values obtained by a plurality of sensors, the system can correct the mixed (or compound) colors while reducing adverse influences on the image quality relating to gradation characteristics even when the sensors have individual differences. Further, by setting appropriate margin areas, the system according the present exemplary embodiment can effectively prevent the image quality from deteriorating even when the sensors have individual differences.

A system according to a third exemplary embodiment of the present invention uses chart data disposed at equal intervals as described below. According to the above-described first and second exemplary embodiments, the controller 102 calculates a predetermined number of pieces of chart data that are allocated to a sensor dedicated to each area. Therefore, the intervals of the chart data may not be equalized in the L*a*b* space.

If the uniformity in the intervals of the chart data is greatly changed in the L*a*b* space, the effects of correcting the mixed (or compound) colors may vary depending on the color gamut. Thus, the system according to the third exemplary embodiment is configured to calculate chart data dedicated to individual sensors while maintaining the uniformity in the intervals of the chart data in the L*a*b* space, as described below.

Figure 16:
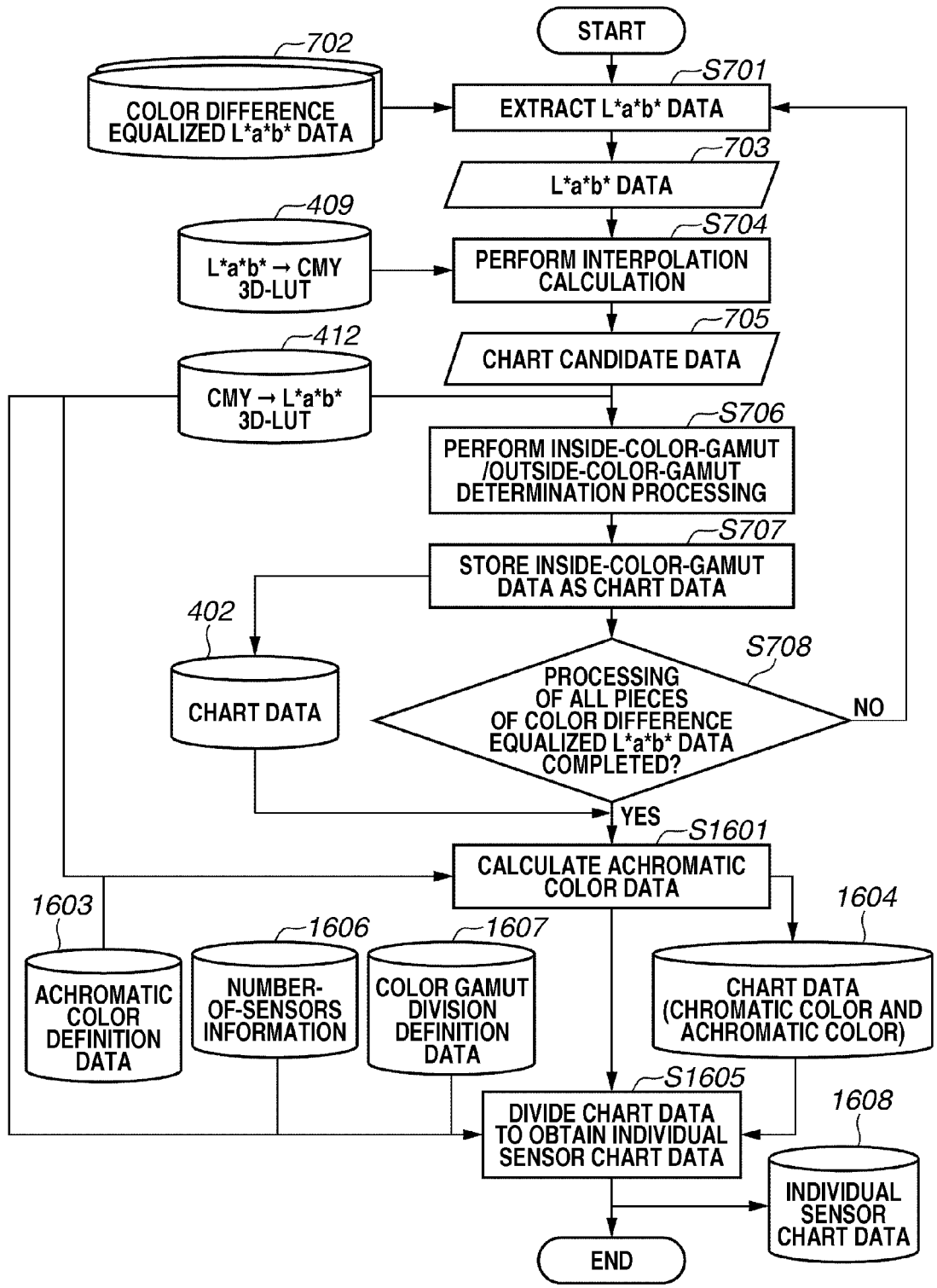
FIG. 16 is a flowchart illustrating an example procedure of chart data generation processing according to a third exemplary embodiment of the present invention.

FIG. 16 illustrates an example procedure of individual sensor chart data calculation processing, in which the uniformity can be maintained in the interval of the chart data in the L*a*b* space. The following processing begins with an instruction from the CPU 103 of the controller 102. Processing to be performed in step S701 to step S708 is similar to the processing in the flowchart illustrated in FIG. 7 and, therefore, the description thereof is not repeated. The generated chart data 402 has uniformity in color differences in the L*a*b* space.

In step S1601, the controller 102 calculates achromatic color data with reference to achromatic color definition data 1603 and the CMY∝3L*a*b* 3D-LUT 412 and obtains chart data (chromatic color and achromatic color) 1604. The achromatic color definition data 1603 is similar to the achromatic color definition data 1004 illustrated in FIG. 10. Next, the controller 102 divides the chart data (chromatic color and achromatic color) 1604 with reference to the CMY→L*a*b* 3D-LUT 412, the number-of-sensors information 1606, and color gamut division definition data 1607 and obtains individual sensor chart data 1608.

More specifically, the controller 102 divides the chart data (chromatic color and achromatic color) 1604 with reference to the CMY→L*a*b* 3D-LUT 412 and the color gamut division definition data 1607. Similar to the other exemplary embodiments, the controller 102 allocates the achromatic color data to the data narrowest in color gamut.

A plurality of pieces of data that are differentiated in type is prepared beforehand as the color gamut division definition data 1607. If the number of pieces of the chart data is not uniform, the controller 102 repeats the above-described processing using another color gamut division definition data.

In the present exemplary embodiment, the controller 102 terminates the processing when the chart data becomes uniform. Alternatively, the controller 102 can use dummy data.

Although the above-described system according to the present exemplary embodiment discriminates between the chromatic color and the achromatic color, it may be unnecessary to discriminate between the chromatic color and the achromatic color in the processing if it is acceptable. Although not described in the present exemplary embodiment, it may be useful to set margin areas as described in the second exemplary embodiment.

The controller 102 performs 4D-LUT generation processing, which is similar to the processing described with reference to the flowchart illustrated in FIG. 12. Therefore, the description of the 4D-LUT generation processing is not repeated.

According to the present exemplary embodiment, when a system is configured to correct mixed (or compound) colors with reference to measured color values obtained by a plurality of sensors, the system can correct the mixed (or compound) colors while reducing adverse influences on the image quality even when the sensors have individual differences.

Further, the system according to the present exemplary embodiment can calculate chart data dedicated to individual sensors while maintaining the uniformity in the intervals of the chart data in the L*a*b* space. Therefore, it becomes feasible to equalize the correction effects of mixed (or compound) colors irrespective of the color gamut.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-146502 filed Jun. 30, 2011, which is hereby incorporated by reference herein in its entirety.

What is claimed is:

1. An information processing apparatus comprising:
a plurality of sensors arranged for reading different patches in a chart for color correction, the chart including a plurality of patches;
a first acquire unit configured to acquire information on a number of the sensors;
a color gamut division unit configured to divide a color gamut into divided color gamuts using the acquired information on the number of sensors; and
a chart data generation unit configured to generate chart data of the chart to be referred in measuring the plurality of patches such that the same sensor among the plurality of sensors measures all patches in each of the divided color gamuts,
wherein the chart data generation unit is configured to generate the chart data such that all patches in an achromatic color area are measured by one of the plurality of sensors.

2. The image processing apparatus according to claim 1, further comprising:
a second acquire unit configured to acquire information on a number of patches to be measured by the sensors,
wherein the chart data generation unit is configured to generate chart data for correcting color that corresponds to each of the plurality of sensors, using the divided color gamuts and the acquired information on the number of patches.

3. The image processing apparatus according to claim 2, wherein the color gamut division unit is configured to determine an achromatic color area independent of the number of sensors, in a case that the color gamut division unit divides the color gamut using the information on the number of sensors.

4. The image processing apparatus according to claim 1, wherein the chart data generation unit is configured to determine a narrowest color gamut that does not include an achromatic color area, from among the divided color gamuts, and is configured to generate the chart data in such a way as to position a predetermined number of patches including an achromatic color area patch in the determined narrowest color gamut.

5. The image processing apparatus according to claim 1, wherein the color gamut division unit is configured to set a margin area at a boundary between the divided color gamuts.

6. The image processing apparatus according to claim 5, wherein an average of values acquired in different color gamuts is used in a case that a color correction is performed for a patch existing in the margin area set at the boundary between the divided color gamuts.

7. The image processing apparatus according to claim 1, wherein the color gamut division unit is configured to divide the color gamut using information on at least one of hue, lightness, and saturation.

8. The image processing apparatus according to claim 1, wherein the color gamut division unit is configured to divide the color gamut such that the generated chart data is equalized in color difference.

9. The image processing apparatus according to claim 1, wherein measured color values are obtained for the patches classified into a chromatic color and an achromatic color in a case that the generated chart data is measured by the sensors.

10. The image processing apparatus according to claim 1, further comprising:
an output unit configured to output a chart using the chart data generated by the chart data generation unit;
a measurement unit configured to cause the sensors to measure the patches on the chart output by the output unit; and
a correction unit configured to correct color on the chart output by the output unit using a measured color value of the patches measured by the measurement unit.

11. The image processing apparatus according to claim 1, wherein the sensors are located on a sheet conveyance path along which the chart is conveyed, and are located behind a fixing device provided on the sheet conveyance path.

12. An image processing method of an image processing apparatus, which comprises a plurality of sensors arranged for reading different patches in a chart for color correction, the chart including a plurality of patches, the method comprising:
acquiring information on a number of the sensors;
dividing a color gamut into divided color gamuts using the acquired information on the number of sensors; and
generating chart data of the chart to be referred in measuring the plurality of patches such that the same sensor among the plurality of sensors measures all patches in each of the divided color gamuts,
wherein the generating generates the chart data such that all patches in an achromatic color area are measured by one of the plurality of sensors.

13. The image processing method according to claim 12, further comprising:
acquiring information on the number of patches to be measured by the sensors; and
generating chart data for correcting color that corresponds to each of the plurality of sensors, using the divided color gamuts and the acquired information on the number of patches.

14. The image processing method according to claim 13, further comprising determining an achromatic color area independent of the number of sensors, in a case that the color gamut is divided using the information on the number of sensors.

15. The image processing method according to claim 12, further comprising:
determining a narrowest color gamut that does not include an achromatic color area, from among the divided color gamuts; and
generating the chart data in such a way as to position a predetermined number of patches including an achromatic color area patch in the determined narrowest color gamut.

16. The image processing method according to claim 12, further comprising setting a margin area at a boundary between the divided color gamuts.

17. The image processing method according to claim 16, wherein an average of values acquired in different color gamuts is used in a case that a color correction is performed for a patch existing in the margin area set at the boundary between the divided color gamuts.

18. The image processing method according to claim 12, further comprising dividing the color gamut using information on at least one of hue, lightness, and saturation.

19. The image processing method according to claim 12, further comprising dividing the color gamut such that the generated chart data is equalized in color difference.

20. The image processing method according to claim 12, wherein measured color values are obtained for the patches classified into a chromatic color and an achromatic color in a case that the generated chart data is measured by the sensors.

21. The image processing method according to claim 12, further comprising:
   outputting a chart using the generated chart data;
   causing the sensors to measure the patches on the output chart; and
   correcting color on the output chart using a measured color value of the measured patch.

22. The image processing method according to claim 12, wherein the sensors are located on a sheet conveyance path along which the chart is conveyed, and are located downstream of a fixing device provided on the sheet conveyance path.

23. A non-transitory computer-readable storage medium storing a program that causes an image processing apparatus, which comprises a plurality of sensors arranged for reading different patches in a chart for color correction, the chart including a plurality of patches, to execute an image processing method comprising:
   acquiring information on a number of the sensors;
   dividing the acquired color gamut into divided color gamuts using the acquired information on the number of sensors; and
   generating chart data of the chart to be referred in measuring the plurality of patches such that the same sensor among the plurality of sensors measures all patches in each of the divided color gamuts,
   wherein the generating generates the chart data such that all patches in an achromatic color area are measured by one of the plurality of sensors.

* * * * *